US008036302B2

(12) United States Patent
    Nakane

(10) Patent No.: US 8,036,302 B2
(45) Date of Patent: Oct. 11, 2011

(54) APPARATUS WITH COMMUNICATION CAPABILITY, METHOD FOR ADJUSTING THE SAME, AND MEDIUM RECORDING ADJUSTING PROGRAM

(75) Inventor: Yoshinori Nakane, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 796 days.

(21) Appl. No.: 12/003,946

(22) Filed: Jan. 3, 2008

(65) Prior Publication Data

US 2008/0181330 A1    Jul. 31, 2008

(30) Foreign Application Priority Data

Jan. 19, 2007    (JP) .................................. 2007-010603

(51) Int. Cl.
    *H04L 27/00*    (2006.01)
(52) U.S. Cl. ....................................................... 375/295
(58) Field of Classification Search .................. 375/295, 375/296, 358; 398/193; 455/114.3, 69
    See application file for complete search history.

(56) References Cited

U.S. PATENT DOCUMENTS 7,583,753 B2 *    9/2009    Okamura ...................... 375/296
2006/0285456 A1 *    12/2006    Ishikawa et al. ........... 369/47.46

FOREIGN PATENT DOCUMENTS

JP    6-177798    6/1994
JP    2003-188863    7/2003

* cited by examiner

*Primary Examiner* — Sam K Ahn
(74) *Attorney, Agent, or Firm* — Staas & Halsey LLP

(57) ABSTRACT

An apparatus with communication capability is connected to another apparatus through a communication path. The apparatus includes a transmitting unit that transmits specific data with a preemphasized component to the other apparatus, the preemphasized component being varied within a predetermined range by changing a setting of a preemphasis driver, and a preemphasis amount control unit that sets, for the preemphasis driver, optimal setting information about the preemphasized component of the specific data received from the other apparatus in response to the transmission of the specific data from the transmitting unit.

10 Claims, 23 Drawing Sheets

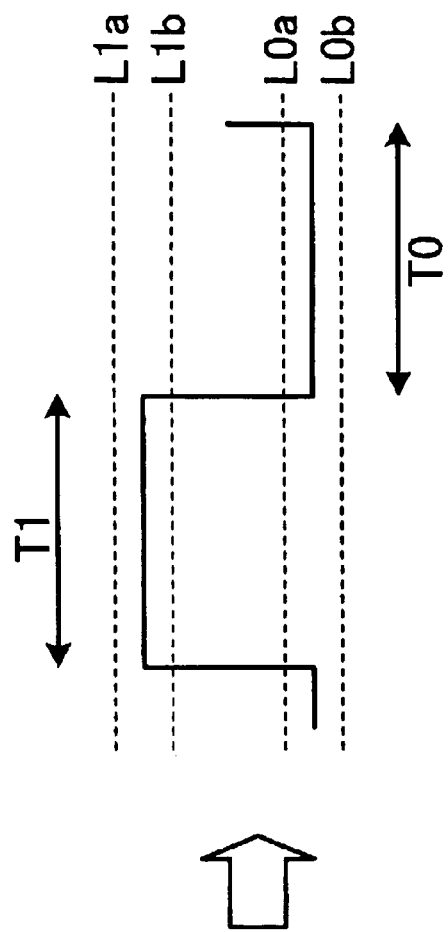
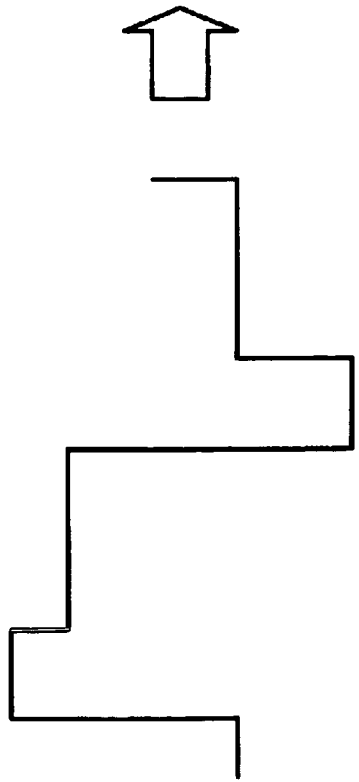
FIG.16

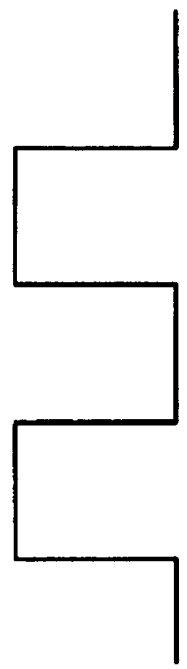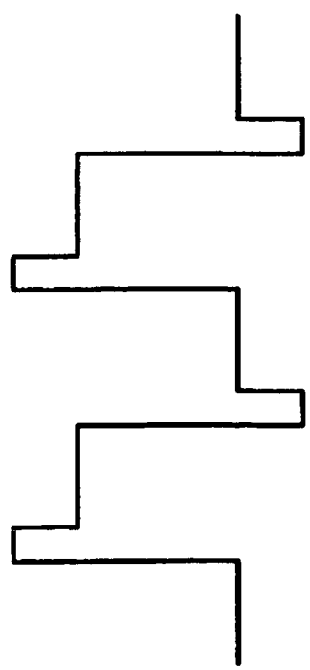
FIG.20

US 8,036,302 B2

APPARATUS WITH COMMUNICATION CAPABILITY, METHOD FOR ADJUSTING THE SAME, AND MEDIUM RECORDING ADJUSTING PROGRAM

BACKGROUND OF THE INVENTION

1. Field of the Invention

The present invention relates to apparatuses with communication capability, a method for adjusting the apparatus with communication capability, and a medium recording adjusting programs executed in the apparatuses.

More specifically, the present invention relates to an apparatus with communication capability, a method for adjusting the apparatus with communication capability and a medium recording adjusting program, in which processing for optimally adjusting the amount of preemphasis on a high-frequency component according to various conditions can be realized by autonomous operation.

2. Description of the Related Art

A transmission path imposes greater attenuation on high-frequency components than on low-frequency components. To address this phenomenon, a known technique preemphasizes a high-frequency component in a transmitting apparatus before transmission. See Japanese Patent Laid-Open No. 6-177798.

The amount of attenuation of a high-frequency component varies with conditions such as the material and length of the transmission path. Therefore, to realize accurate information transmission, the amount of preemphasis on the high-frequency component needs to be adjusted according to these conditions. Especially in high-speed transmission paths that are becoming common in recent years, such as of 10 Gbps, it is very important to optimally adjust the amount of preemphasis because of the great attenuation of the high-frequency component.

However, conventionally, the amount of preemphasis on the high-frequency component has been adjusted by a human being, for example based on experiments. Therefore, human operation for readjusting the amount of preemphasis has been required every time the material, length, or the like of the transmission path is changed, and this has been laborious. In some cases, for reasons such as a mismatch between expected operational conditions and actual operational conditions, the transmission path has been operated with a non-optimal amount of preemphasis on the high-frequency component; this has prevented full utilization of the performance of the transmission path.

The present invention has been made for solving the above problems of conventional techniques. It is an object of the present invention to provide an apparatus with communication capability, and an adjusting program, in which processing for optimally adjusting the amount of preemphasis on a high-frequency component according to various conditions can be realized by autonomous operation.

SUMMARY OF THE INVENTION

In accordance with an aspect of the present embodiment, an apparatus with communication capability connected to another apparatus through a communication path to communicate with the other apparatus includes a transmitting unit that transmits specific data with a preemphasized component to the other apparatus, the preemphasized component being varied within a predetermined range by changing a setting of a preemphasis driver, and a preemphasis amount control unit that sets, for the preemphasis driver, optimal setting information about the preemphasized component of the specific data received from the other apparatus in response to the transmission of the specific data from the transmitting unit.

The above-described embodiments of the present invention are intended as examples, and all embodiments of the present invention are not limited to including the features described above.

BRIEF DESCRIPTION OF THE DRAWINGS

FIG. 16 is a diagram showing exemplary times during which the waveforms fall within the predetermined ranges when the amount of preemphasis is optimized;

FIG. 20 is a diagram showing an exemplary signal transmitted with preemphasis on the high-frequency component;

DETAILED DESCRIPTION OF THE PREFERRED EMBODIMENTS

Figure 1:
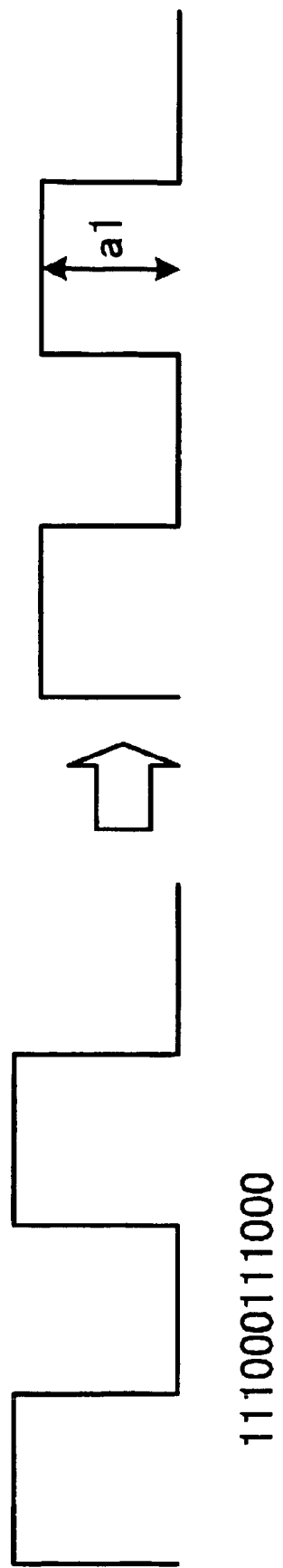
FIG. 1 is a diagram showing an exemplary low-frequency signal transmitted without preemphasis on a high-frequency component.

Reference may now be made in detail to embodiments of the present invention, examples of which are illustrated in the accompanying drawings, wherein like reference numerals refer to like elements throughout.

With reference to the accompanying drawings, preferred embodiments of an apparatus with communication capability and an adjusting program according to the present invention will be described in detail below. The following embodiments are not intended to limit the present invention, and it is also possible to use the invention described in each embodiment in combination as appropriate.

First Embodiment

First, preemphasis on a high-frequency component in signal transmission will be described. In transmission of a signal through a transmission path, a transmitting apparatus transmits the signal with its rising edge and falling edge preemphasized by one bit in advance as shown in FIG. 20, allowing for attenuation of the high-frequency component in the transmission path.

Figure 21:
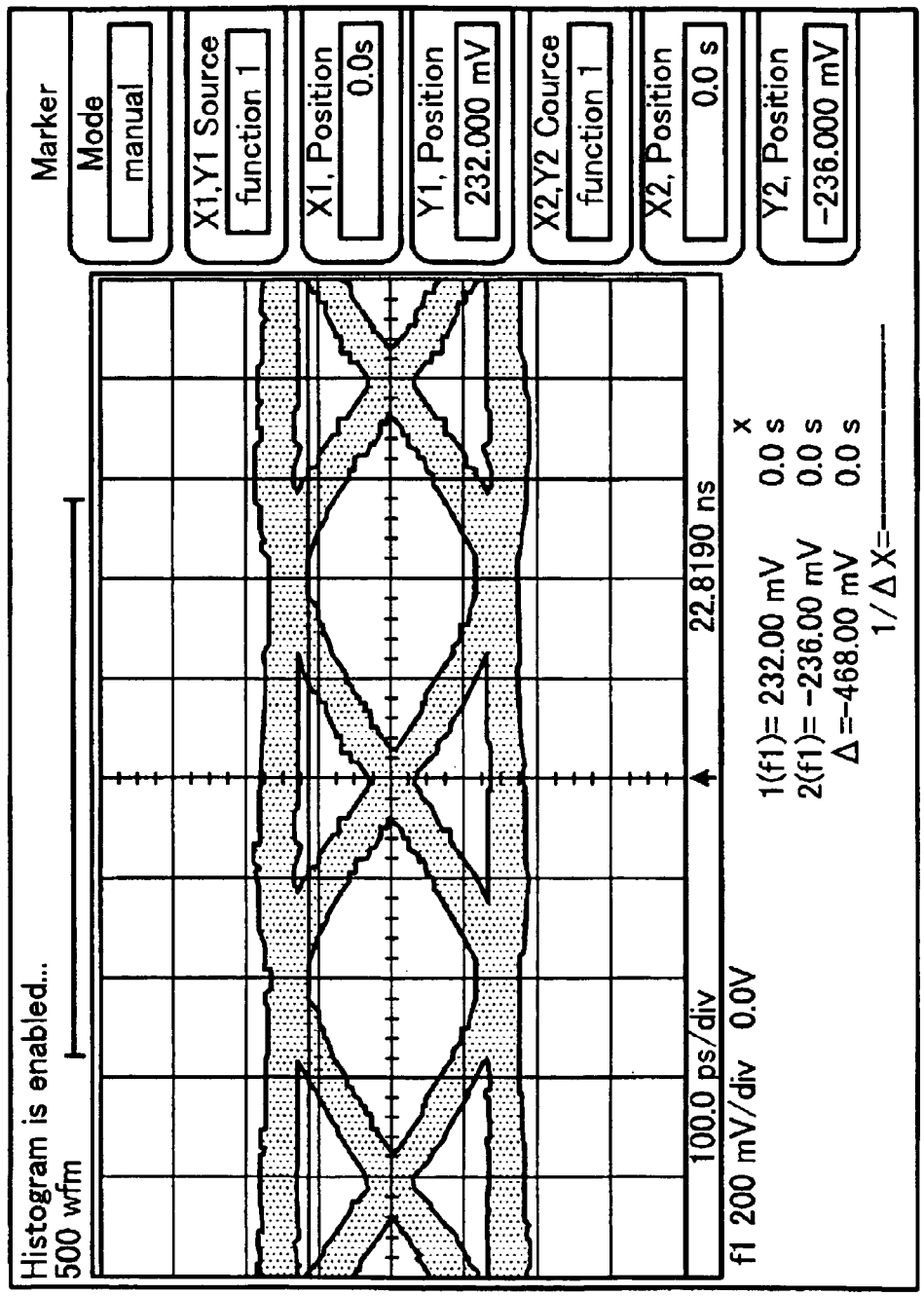
FIG. 21 is a diagram showing the state in which the amount of preemphasis is optimized.

If the amount of preemphasis is appropriate, the preemphasized parts disappear due to the attenuation in the transmission path, and a receiving apparatus accurately receives a waveform desired to be transmitted by the transmitting apparatus. The signal received by the receiving apparatus has fewer jitter components as in an eye chart shown in FIG. 21.

Figure 22:
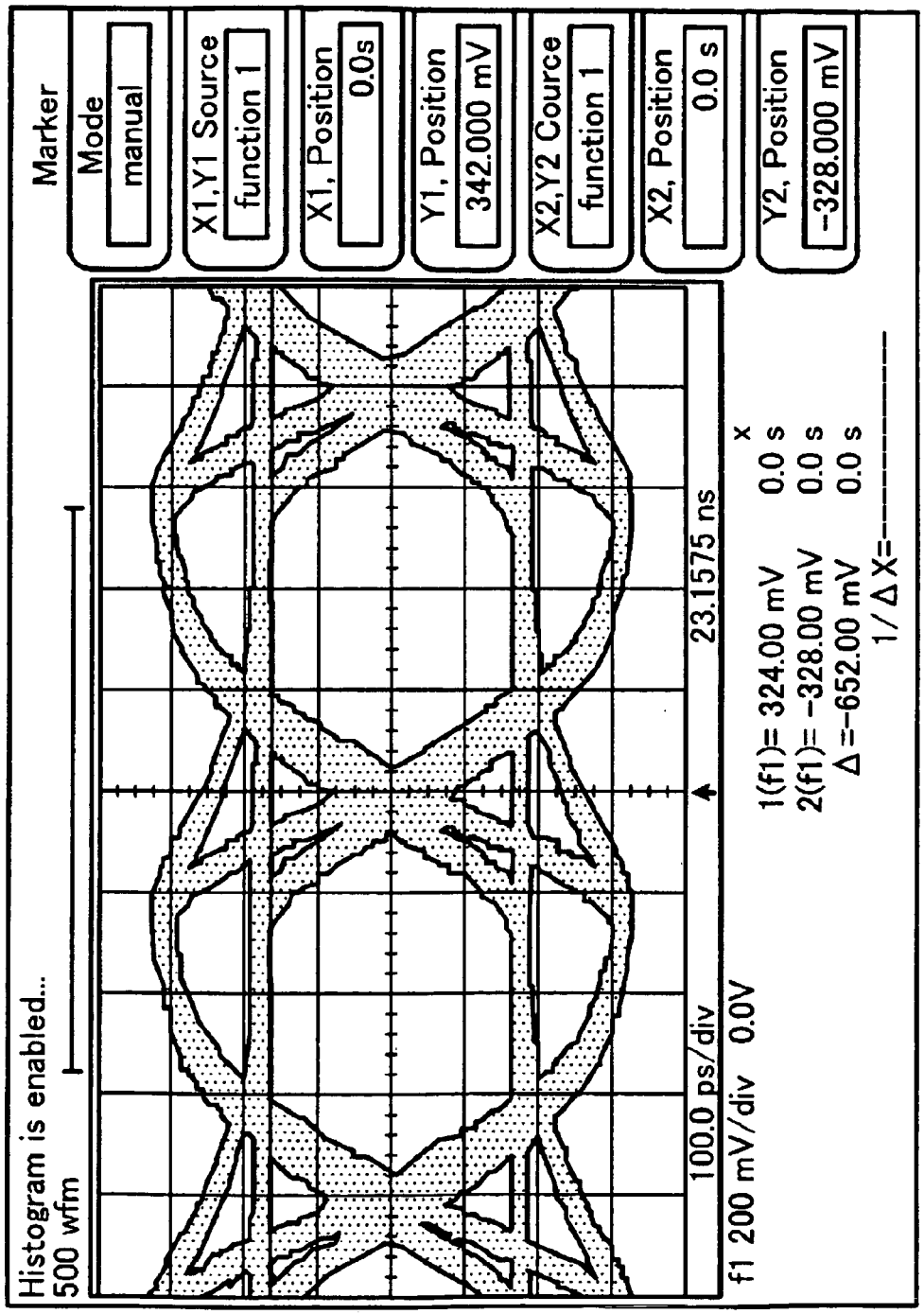
FIG. 22 is a diagram showing the state in which the preemphasized component remains.

However, if the amount of preemphasis applied to the high-frequency component in the transmitting apparatus is too large, the preemphasized parts are not completely attenuated in the transmission path. As a result, the signal received by the receiving apparatus has more jitter components as in an eye chart shown in FIG. 22.

Figure 23:
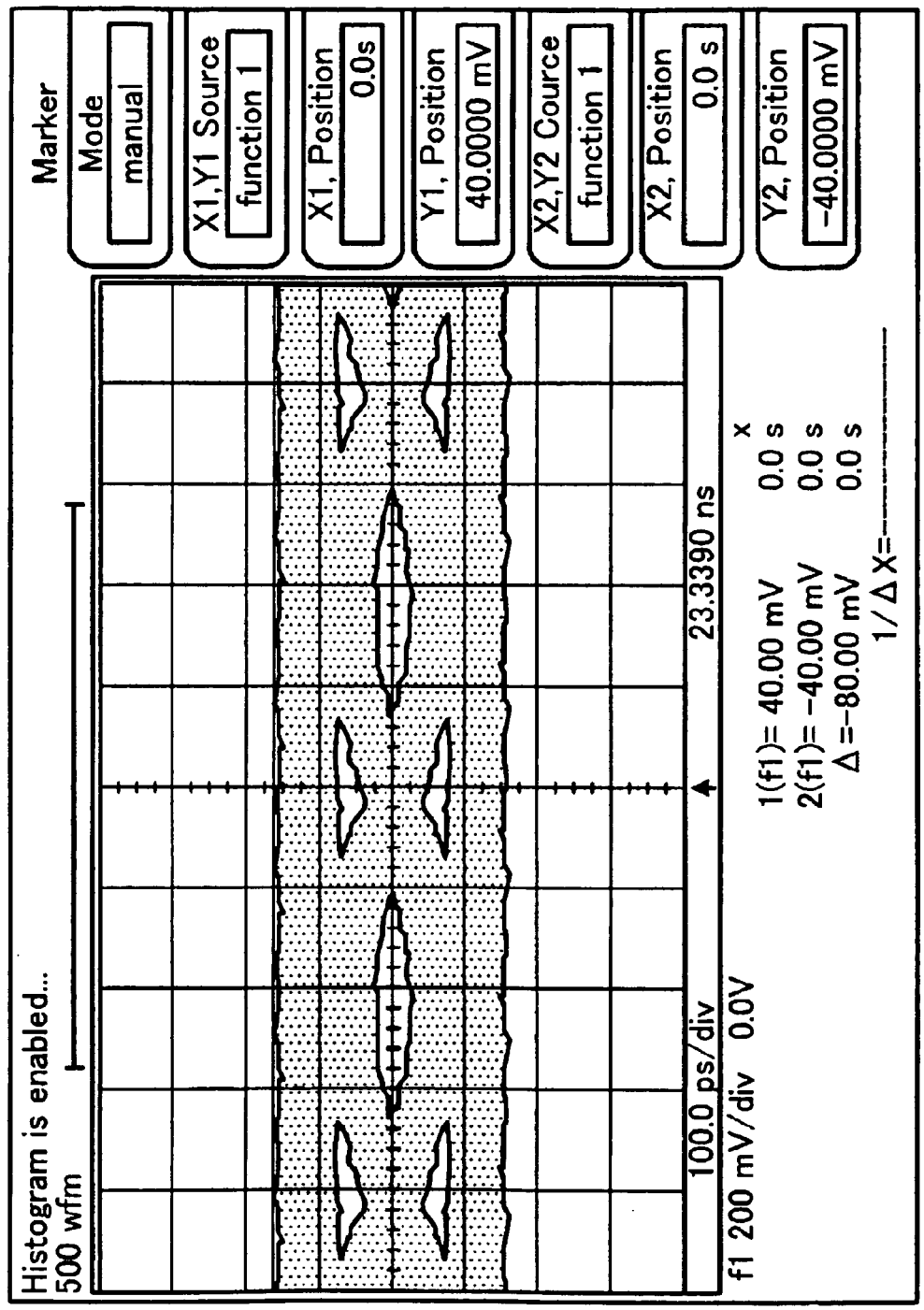
FIG. 23 is a diagram showing the state in which transmission loss of the high-frequency component occurs.

If the amount of preemphasis applied to the high-frequency component in the transmitting apparatus is too small, transmission loss of the high-frequency component occurs in the transmission path. As a result, the signal received by the receiving apparatus has more jitter components as in an eye chart shown in FIG. 23.

Thus, in signal transmission through a transmission path, the amount of preemphasis on the high-frequency component needs to be appropriately adjusted in the transmitting apparatus in order to transmit a signal of a good quality to the receiving apparatus. The optimal amount of preemphasis on the high-frequency component varies with conditions such as the material and length of the transmission path. Adjusting methods according to the present invention enable the amount of preemphasis on the high-frequency component to be automatically optimized with cooperation between the transmitting apparatus and the receiving apparatus.

Now, the outline of an adjusting method according to an embodiment will be described. In the adjusting method according to this embodiment, as shown in FIG. 1, a transmitting apparatus first transmits a low-frequency signal without preemphasis on the high-frequency component to a receiving apparatus, which then obtains an amplitude $a1$ of the received signal. The low-frequency signal may be transmitted in such a manner that a plurality of bits of the logical value 1 and a plurality of bits of the logical value 0 are alternately transmitted, for example "111000111000 . . . ".

The amplitude $a1$ obtained here represents an amplitude that should be assumed by all signals at the receiving apparatus whether the frequency is high or low. The reason to transmit the low-frequency signal without preemphasis on the high-frequency component is to prevent the preemphasized component from remaining, resulting in an inappropriately great amplitude $a1$. The amplitude $a1$ may be an average of amplitudes sampled at a plurality of points in time rather than a value sampled at one point in time.

Figure 2:
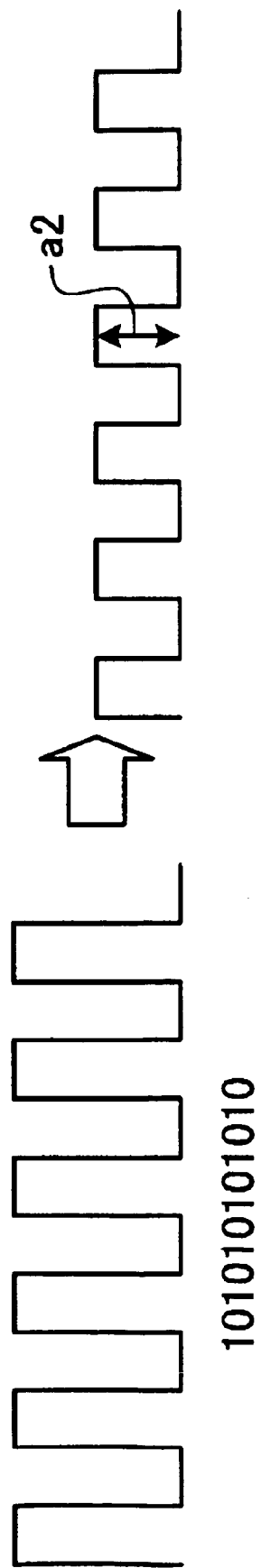
FIG. 2 is a diagram showing an exemplary high-frequency signal transmitted without preemphasis on the high-frequency component.

Then, as shown in FIG. 2, the transmitting apparatus transmits a high-frequency signal without preemphasis on the high-frequency component to the receiving apparatus, which then obtains an amplitude $a2$ of the received signal. The high-frequency signal may be transmitted in such a manner that one bit of the logical value 1 and one bit of the logical value 0 are alternately transmitted, for example "101010 . . . ".

Since the high-frequency signal suffers greater attenuation in the transmission path than the low-frequency signal, the amplitude $a2$ obtained here takes a smaller value than the amplitude $a1$. The amplitude $a2$ may be an average of amplitudes sampled at a plurality of points in time rather than a value sampled at one point in time.

Figure 3:
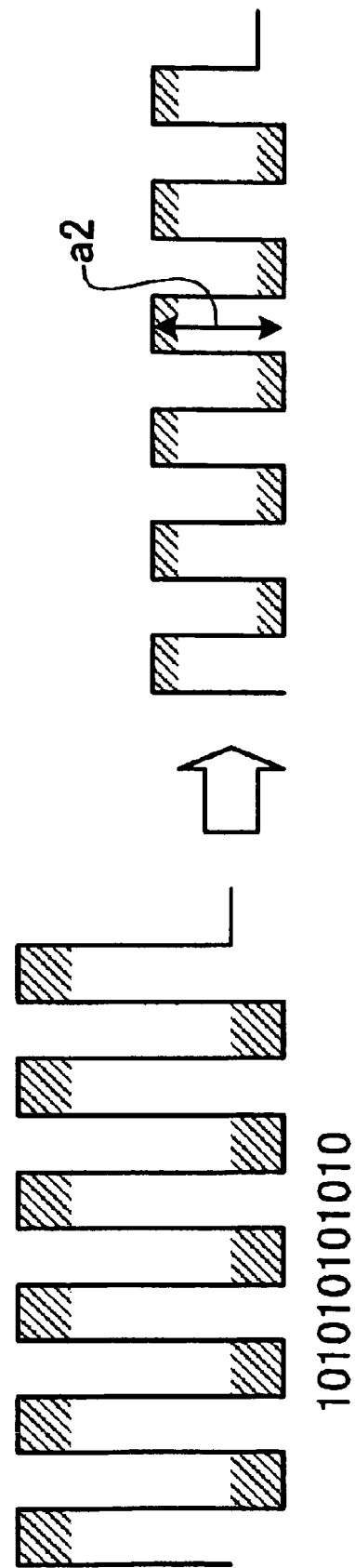
FIG. 3 is a diagram showing an exemplary high-frequency signal transmitted with preemphasis on the high-frequency component.

The receiving apparatus feeds back the magnitude of the difference between the amplitude $a1$ and the amplitude $a2$ to the transmitting apparatus. The transmitting apparatus sets the amount of preemphasis on the high-frequency component according to the fed-back magnitude of the difference as shown in FIG. 3, and transmits the high-frequency signal to the receiving apparatus.

The receiving apparatus again obtains the amplitude $a2$ of the received signal. When the high-frequency signal has its high-frequency component preemphasized, the entire signal is preemphasized. Therefore, the amplitude $a2$ obtained here represents an amplitude after the preemphasized high-frequency parts have been attenuated through the transmission path.

Thus, if the amplitude $a2$ obtained here is equal to the amplitude $a1$, i.e., if the amplitude after the preemphasized parts of the high-frequency component have been attenuated is equal to the amplitude that should be assumed by all signals at the receiving signal whether the frequency is high or low, the amount of preemphasis applied to the high-frequency component in the transmitting apparatus is optimized. Therefore, the receiving apparatus informs the transmitting apparatus that the amount of preemphasis is optimized, and the adjusting processing is completed.

If the amplitude $a2$ is different from the amplitude $a1$, the receiving apparatus feeds back the magnitude of the difference between the amplitude $a1$ and the amplitude $a2$ to the transmitting apparatus. The transmitting apparatus again sets the amount of preemphasis on the high-frequency component according to the fed-back magnitude of the difference and transmits the high-frequency signal to the receiving apparatus. This sequential processing is repeated until the amplitude $a1$ becomes equal to the amplitude $a2$.

In this manner, in the adjusting method according to this embodiment, the amplitude of a high-frequency signal transmitted with a varying amount of preemphasis is compared with the amplitude of a low-frequency signal transmitted without preemphasis on the high-frequency component. The amount of preemphasis on the high-frequency component is optimized by making an adjustment to match the two amplitudes. The above-described adjusting method is performed before starting transmission of main signals.

Figure 4:
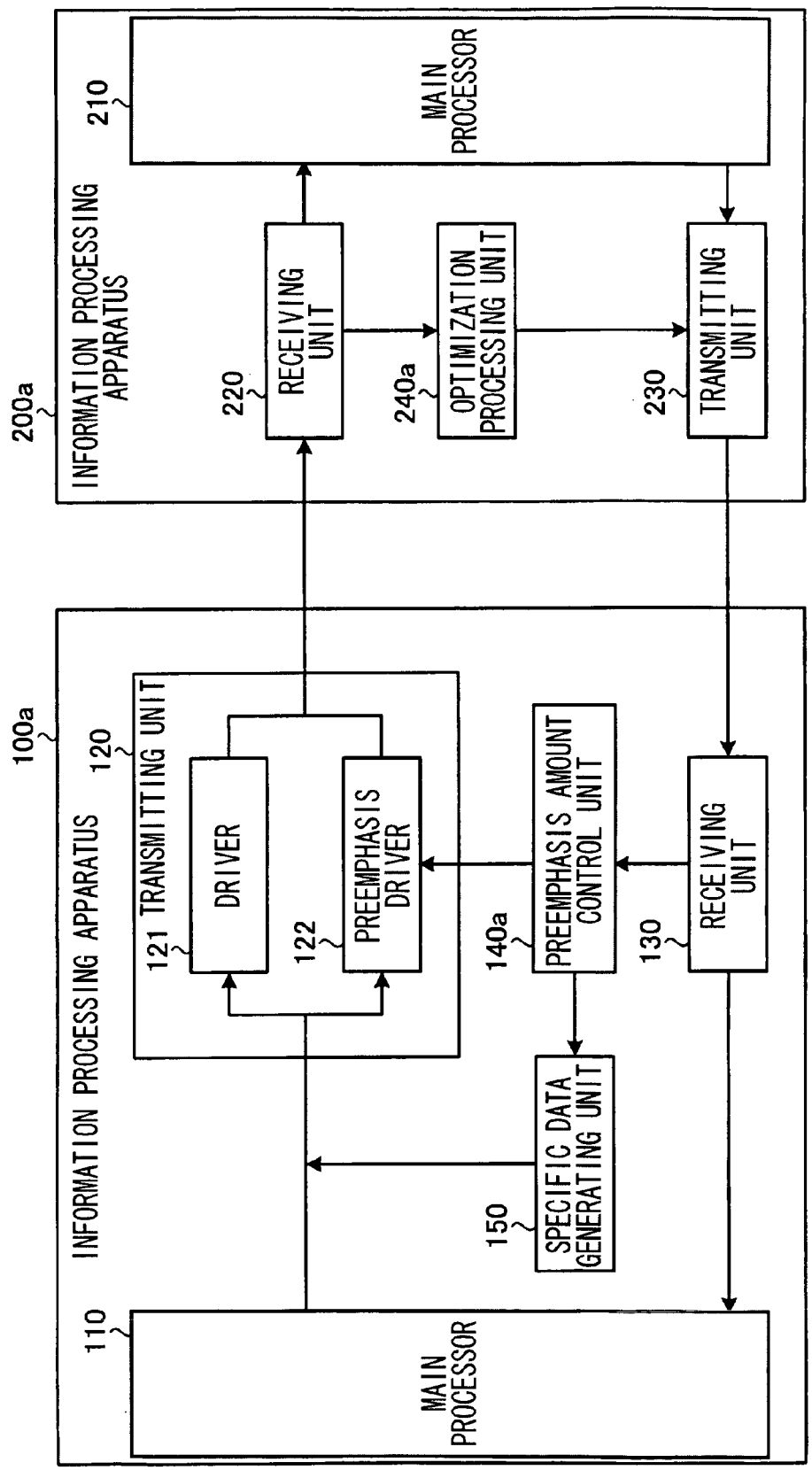
FIG. 4 is a functional block diagram showing the configuration of a transmission system according to a first embodiment.

Now, the configuration of a transmission system that performs the adjusting method according to this embodiment will be described. FIG. 4 is a functional block diagram showing the configuration of the transmission system according to this embodiment. As shown, the transmission system according to this embodiment includes an information processing apparatus 100a and an information processing apparatus 200a connected to each other.

For simplicity, FIG. 4 illustrates only the configuration for optimizing the amount of preemphasis on the high-frequency component of a signal transmitted from the information processing apparatus 100a to the information processing apparatus 200a. As used herein, information processing apparatuses generally mean apparatuses that exchange information with other apparatuses, and include communication apparatuses and so on. The connection between the information processing apparatus 100a and the information processing apparatus 200a may be based on any technique. For example, it may be network-based connection, or connection through a dedicated cable for interconnecting the apparatuses.

The information processing apparatus 100a includes a main processor 110, a transmitting unit 120, a receiving unit 130, a preemphasis amount control unit 140a, and a specific data generating unit 150. The main processor 110 is a processing unit that performs processing primarily intended by the information processing apparatus 100a.

The transmitting unit 120 is a processing unit that converts a bit string requested for transmission by the main processor 110 or the specific data generating unit 150 into a transmission signal and transmits the signal toward the information processing apparatus 200a. The transmitting unit 120 includes a driver 121 and a preemphasis driver 122, so that a waveform that is output from the driver 121 and a waveform that is output from the preemphasis driver 122 are combined together and transmitted.

The driver 121 is a processing unit that generates a normal waveform for transmitting the bit string requested for transmission. That is, the driver 121 generates a waveform in which parts corresponding to 1 in the bit string requested for transmission are set to High and parts corresponding to 0 are set to Low. The preemphasis driver 122 is a processing unit that generates a waveform for preemphasizing the high-frequency component upon a shift from 1 to 0 or from 0 to 1 in the bit string requested for transmission. The amount of preemphasis is varied under the control of the preemphasis amount control unit 140a.

The receiving unit 130 is a processing unit that receives a signal transmitted from the information processing apparatus 200a and converts the signal into a bit string. During the execution of the processing for optimizing the amount of preemphasis on the high-frequency component, the receiving unit 130 outputs the converted bit string to the preemphasis amount control unit 140a. Otherwise, the receiving unit 130 outputs the converted bit string to the main processor 110.

The preemphasis amount control unit 140a is a control unit that performs control for optimizing the amount of preemphasis on the high-frequency component of the signal to be output from the transmitting unit 120. Specific control of the preemphasis amount control unit 140a will be described in detail in the description of a procedure for the transmission system according to this embodiment. The specific data generating unit 150 is a control unit that generates, under the control of the reemphasis amount control unit 140a, a specific bit string required for transmitting various signals used in the processing for optimizing the amount of preemphasis on the high-frequency component.

The information processing apparatus 200a includes a main processor 210, a receiving unit 220, a transmitting unit 230, and an optimization processing unit 240a. The main processor 210 is a processing unit that performs processing primarily intended by the information processing apparatus 200a.

The receiving unit 220 is a processing unit that receives a signal transmitted from the information processing apparatus 100a, converts the signal into a bit string, and outputs the bit string to the main processor 210. During the execution of the processing for optimizing the amount of preemphasis on the high-frequency component, the receiving unit 220 outputs the received signal directly to the optimization processing unit 240a without conversion into a bit string.

The transmitting unit 230 is a control unit that converts a bit string requested for transmission by the main processor 210 or the optimization processing unit 240a into a transmission signal and transmits the signal toward the information processing apparatus 100a. The optimization processing unit 240a is a processing unit that performs processing for optimizing the amount of preemphasis on the high-frequency component of the signal received by the receiving unit 220. Specific processing of the optimization processing unit 240a will be described in detail in the description of the procedure for the transmission system according to this embodiment.

Figure 5:
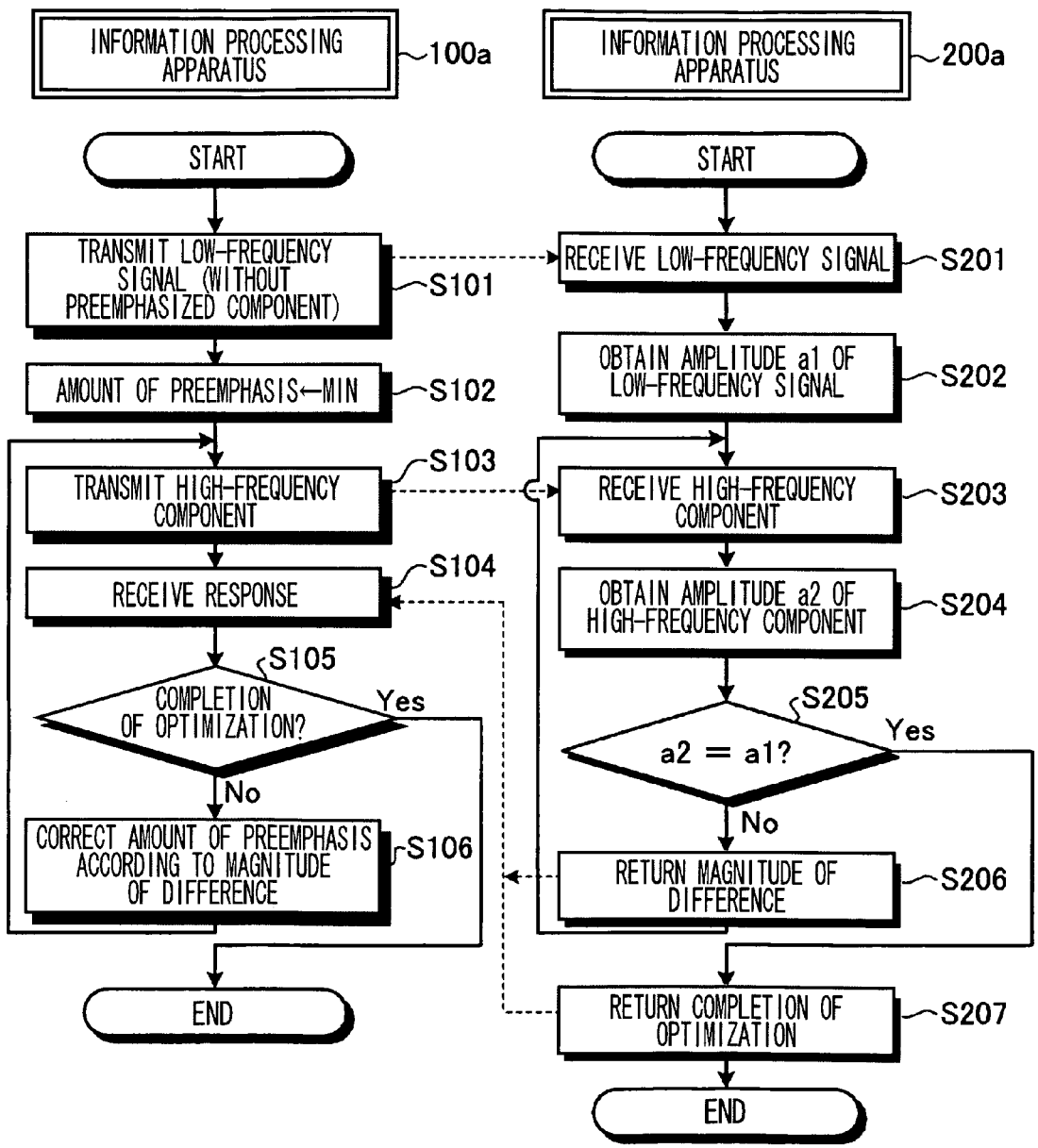
FIG. 5 is a flowchart showing a procedure for the transmission system according to the first embodiment.

Now, the procedure for the transmission system according to this embodiment will be described. FIG. 5 is a flowchart showing the procedure for the transmission system according to this embodiment. FIG. 5 shows the procedure for optimizing the amount of preemphasis on the high-frequency component of the signal transmitted from the information processing apparatus 100a to the information processing apparatus 200a. This procedure is performed before starting transmission of main signals from the information processing apparatus 100a to the information processing apparatus 200a.

To optimize the amount of preemphasis on the high-frequency component, first in the information processing apparatus 100a, the preemphasis amount control unit 140a sets the preemphasis driver 122 not to preemphasize the high-frequency component. The preemphasis amount control unit 140a then instructs the specific data generating unit 150 to generate specific data (e.g., a bit string like "111000...") for generating a low-frequency signal and to output the specific data to the transmitting unit 120. This control causes transmission of the low-frequency signal without preemphasis on the high-frequency component from the information processing apparatus 100a to the information processing apparatus 200a (operation S101).

The low-frequency signal is received by the receiving unit 220 of the information processing apparatus 200a (operation S201), and the optimization processing unit 240a obtains the amplitude a1 of the signal (operation S202). This amplitude a1 represents an amplitude that should be assumed by all signals whether the frequency is high or low. The amplitude of the signal may be obtained with a digital circuit by performing AD conversion, or with an analog circuit by using a comparator.

Then, in the information processing apparatus 100a, the preemphasis amount control unit 140a sets the preemphasis driver 122 so that a minimum amount of preemphasis is applied to the high-frequency component (operation S102). The preemphasis amount control unit 140a then instructs the specific data generating unit 150 to generate specific data (e.g., a bit string like "101010...") for generating a high-frequency signal and to output the specific data to the transmitting unit 120. This control causes transmission of the high-frequency signal from the information processing apparatus 100a to the information processing apparatus 200a (operation S103).

The high-frequency signal is received by the receiving unit 220 of the information processing apparatus 200a (operation S203), and the optimization processing unit 240a obtains the amplitude a2 of the signal (operation S204). The optimization processing unit 240a compares the amplitude a1 and the amplitude a2. If the amplitude a1 and the amplitude a2 are different (No in operation S205), the optimization processing unit 240a transmits a response indicating the magnitude of the difference between the amplitude a1 and the amplitude a2 to the information processing apparatus 100a via the transmitting unit 230 (operation S206).

The optimization processing unit 240a waits for reception of the next high-frequency signal.

If the amplitude a1 and the amplitude a2 are equal (Yes in operation S205), the amount of preemphasis on the high-frequency component is optimized. Therefore, the optimization processing unit 240a transmits a response indicating the completion of optimization to the information processing apparatus 100a via the transmitting unit 230 (operation S207) and terminates the processing.

In the information processing apparatus 100a, the preemphasis amount control unit 140a receives the response transmitted from the information processing apparatus 200a via the receiving unit 130 (operation S104). If the response indicates the completion of optimization (Yes in operation S105), the preemphasis amount control unit 140a terminates the processing.

If the response indicates the magnitude of the difference (No in operation S105), the preemphasis amount control unit 140a determines a corrected amount of preemphasis on the high-frequency component according to the magnitude of the difference and corrects the setting of the preemphasis driver 122 (operation S106). The preemphasis amount control unit 140a returns to operation S103 to perform the control for transmitting the high-frequency signal to the information processing apparatus 200a.

As described above, in the first embodiment, the amplitude of a high-frequency signal transmitted with a varying amount of preemphasis is compared with the amplitude of a low-frequency signal transmitted without preemphasis on the high-frequency component.

Adjustment is made between the transmitting apparatus and the receiving apparatus so that the two frequencies match. Thus, the autonomous cooperation between these apparatuses enables optimization of the amount of preemphasis on the high-frequency component.

In the above-described embodiment, the low-frequency signal is transmitted only once at the beginning. However, the low-frequency signal and the high-frequency signal may be alternately transmitted to allow the receiving apparatus to compare the amplitude of every received high-frequency signal with that of the immediately preceding low-frequency signal.

Figure 6:
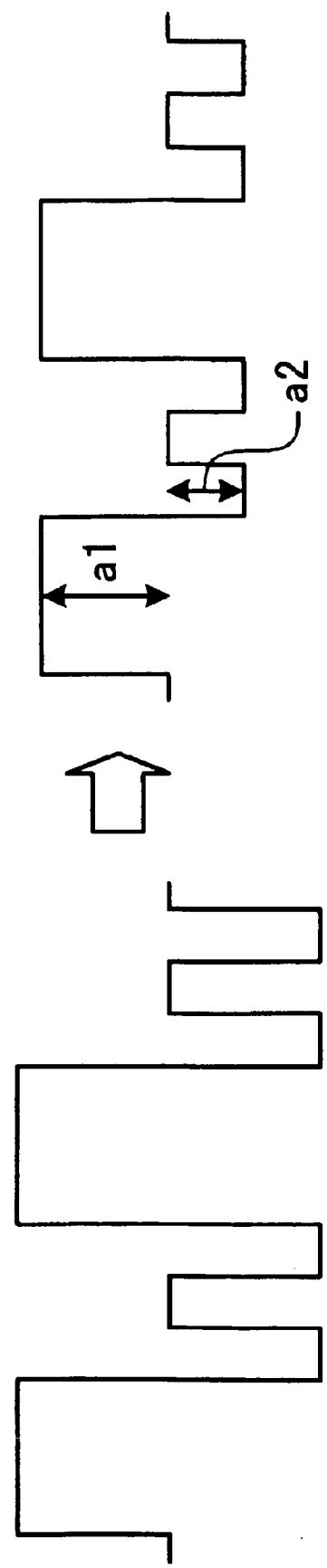
FIG. 6 is a diagram showing an example in which signals with different frequencies are transmitted for a positive logical line and a negative logical line.

Alternatively, as shown in FIG. 6, signals of different frequencies may be transmitted for a positive logical line and a negative logical line so that the respective amplitudes are compared. For example, the low-frequency signal may be transmitted for the positive logical line, and the high-frequency signal may be transmitted for the negative logical line.

Second Embodiment

For a second embodiment, description will be given of an example in which the receiving apparatus detects the number of edges in a received signal and optimizes the amount of preemphasis on the high-frequency component based on the detection result.

Figure 7:
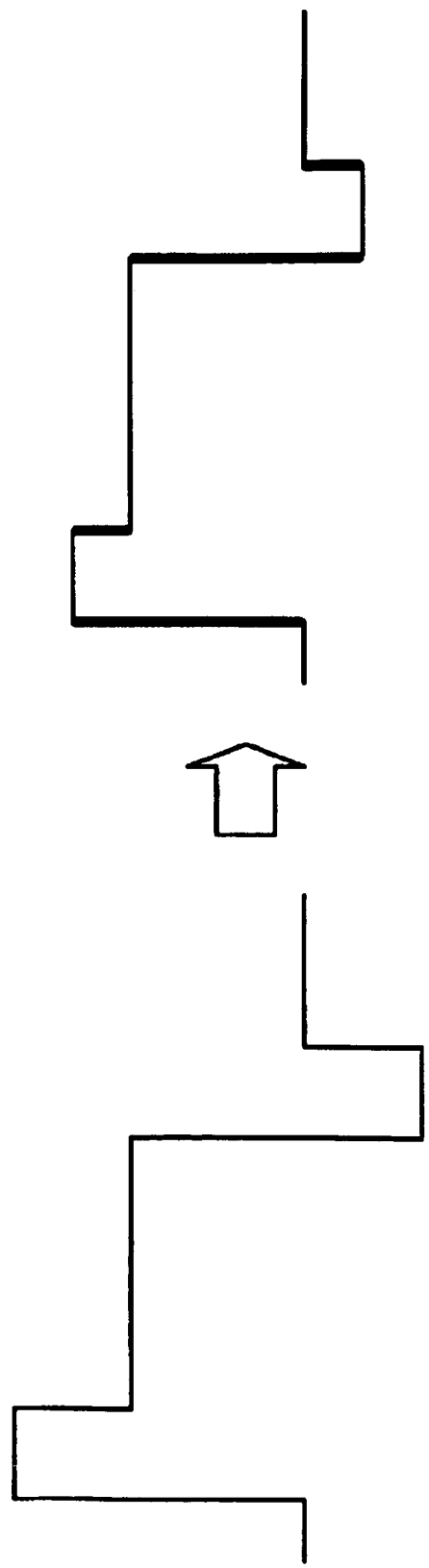
FIG. 7 is a diagram showing exemplary edges detected in a receiver when a signal of a specific pattern is transmitted.

First, the outline of an adjusting method according to this embodiment will be described. In the adjusting method according to this embodiment, as shown in FIG. 7, the transmitting apparatus transmits a signal of a specific pattern with preemphasis on the high-frequency component to the receiving apparatus. The receiving apparatus detects the number of edges in the received signal. For example, in the example of FIG. 7, the receiving apparatus detects four edges.

The signal of the specific pattern from the transmitting apparatus to the receiving apparatus is transmitted initially with a relatively large amount of preemphasis on the high-frequency component. The transmission is repeated with a gradually reduced amount of preemphasis. Meanwhile, the receiving apparatus detects the number of edges in every received signal of the specific pattern and compares it with the number of edges in the first received signal.

When the receiving apparatus recognizes that the number of edges in a received signal is smaller than that in the first received signal, the receiving apparatus informs the transmitting apparatus that the amount of preemphasis is optimized, and completes the adjusting processing.

Figure 8:
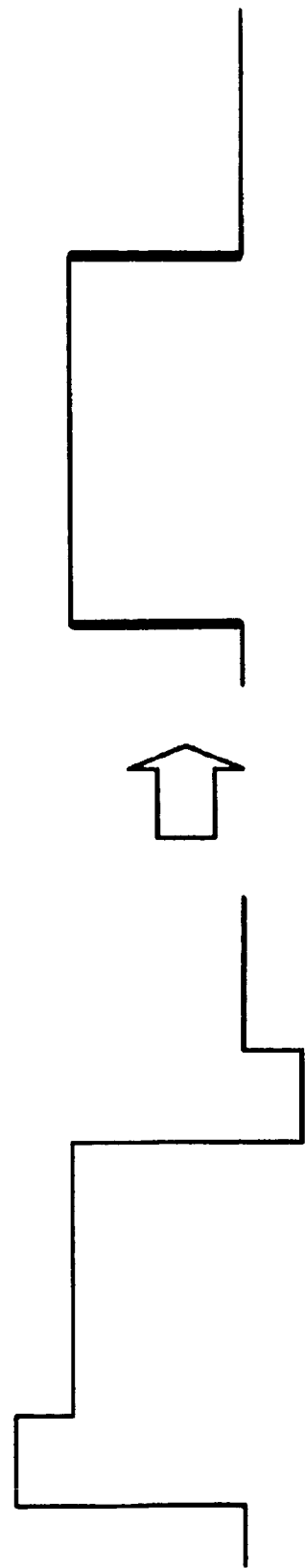
FIG. 8 is a diagram showing exemplary edges detected in the receiver when the amount of preemphasis is optimized.

Initially, since the high-frequency component is relatively highly preemphasized, the number of edges in the signal received by the receiving apparatus includes the number of edges created at the preemphasized parts. Then, the amount of preemphasis on the high-frequency component is reduced until optimized, at which point the edges at the preemphasized parts are no more detected as shown in FIG. 8. Therefore, the number of edges in the signal received by the receiving apparatus decreases. For example, in the example of FIG. 8, the number of edges decreases from four to two.

In this manner, the adjusting method according to this embodiment utilizes the fact that the number of edges in the signal received by the receiving apparatus changes upon optimization of the amount of preemphasis on the high-frequency component. The adjusting method thus automatically optimizes the amount of preemphasis on the high-frequency component.

Figure 9:
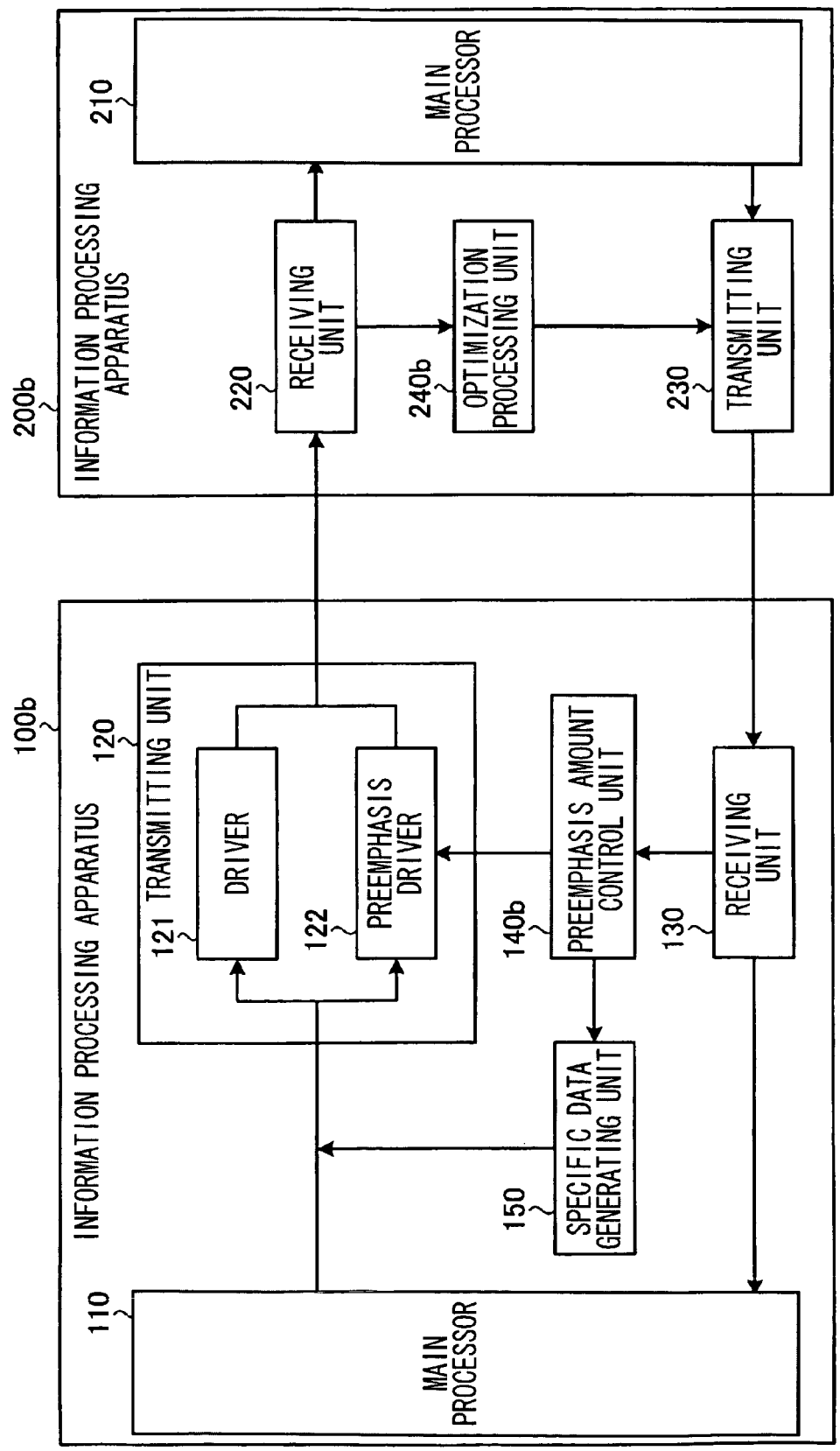
FIG. 9 is a functional block diagram showing the configuration of a transmission system according to a second embodiment.

Now, the configuration of a transmission system that performs the adjusting method according to this embodiment will be described. FIG. 9 is a functional block diagram showing the configuration of the transmission system according to this embodiment. As shown, the transmission system according to this embodiment includes an information processing apparatus 100b and an information processing apparatus 200b connected to each other.

For simplicity, FIG. 9 illustrates only the configuration for optimizing the amount of preemphasis on the high-frequency component of a signal transmitted from the information processing apparatus 100b to the information processing apparatus 200b. As used herein, information processing apparatuses generally mean apparatuses that exchange information with other apparatuses, and include communication apparatuses and so on. The connection between the information processing apparatus 100b and the information processing apparatus 200b may be based on any technique. For example, it may be network-based connection, or connection through a dedicated cable for interconnecting the apparatuses.

As shown, the information processing apparatus 100b has the same configuration as the information processing apparatus 100a shown in FIG. 4 except that the preemphasis amount control unit 140a is replaced with a preemphasis amount control unit 140b. The information processing apparatus 200b has the same configuration as the information processing apparatus 200a shown in FIG. 4 except that the optimization processing unit 240a is replaced with an optimization processing unit 240b.

The preemphasis amount control unit 140b is a control unit that performs control for optimizing the amount of preemphasis on the high-frequency component of the signal to be output from the transmitting unit 120. Specific control of the preemphasis amount control unit 140b will be described in detail in the description of a procedure for the transmission system according to this embodiment.

The optimization processing unit 240b is a processing unit that performs processing for optimizing the amount of preemphasis on the high-frequency component of the signal received by the receiving unit 220. Specific processing of the optimization processing unit 240b will be described in detail in the description of the procedure for the transmission system according to this embodiment.

Figure 10:
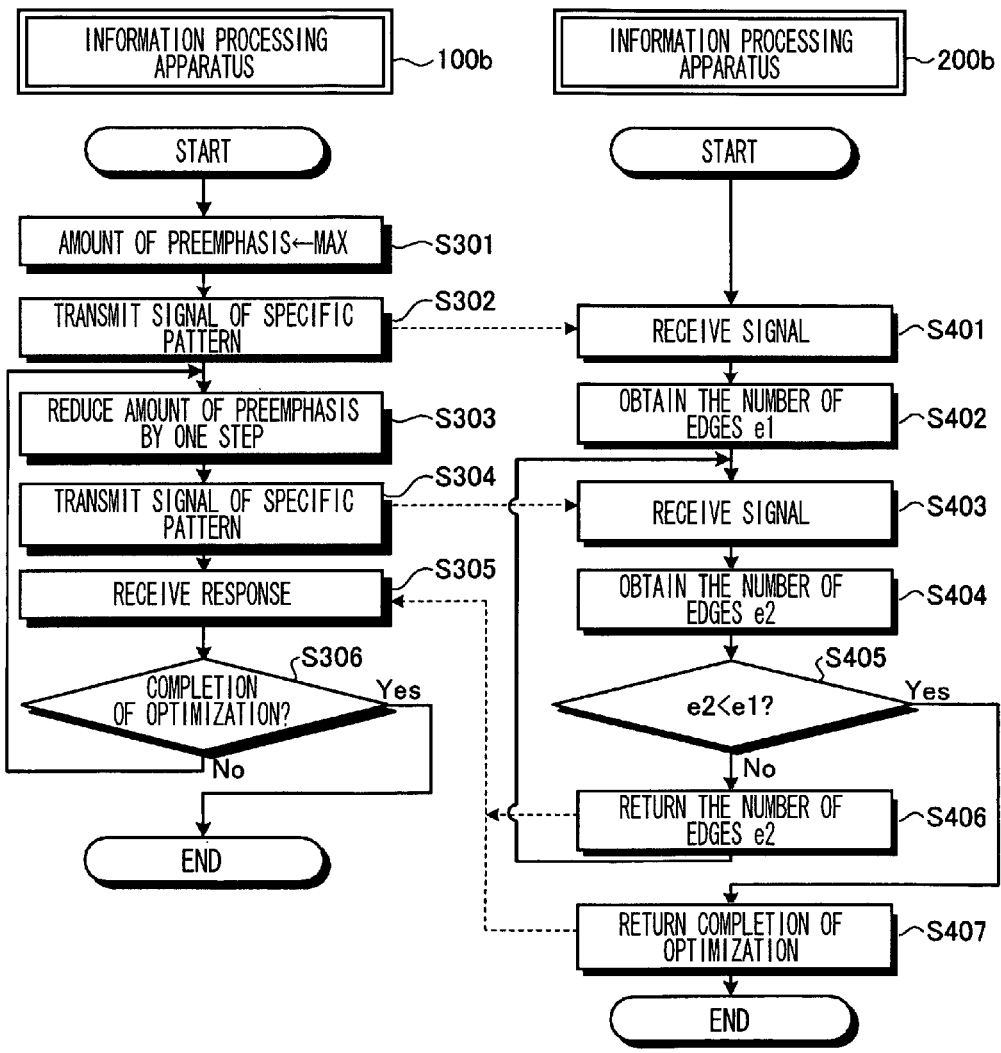
FIG. 10 is a flowchart showing a procedure for the transmission system according to the second embodiment.

Now, the procedure for the transmission system according to this embodiment will be described. FIG. 10 is a flowchart showing the procedure for the transmission system according to this embodiment. FIG. 10 shows the procedure for optimizing the amount of preemphasis on the high-frequency component of the signal transmitted from the information processing apparatus 100b to the information processing apparatus 200b. This procedure is performed before starting transmission of main signals from the information processing apparatus 100b to the information processing apparatus 200b.

To optimize the amount of preemphasis on the high-frequency component, first in the information processing apparatus 100b, the preemphasis amount control unit 140b sets the preemphasis driver 122 to preemphasize the high-frequency component up to a preset maximum value (operation S301). The preemphasis amount control unit 140b then instructs the specific data generating unit 150 to generate data of a specific pattern and to output the data to the transmitting unit 120. This control causes transmission of a signal of the specific pattern with preemphasis on the high-frequency component from the information processing apparatus 100b to the information processing apparatus 200b (operation S302).

The signal of the specific pattern is received by the receiving unit 220 of the information processing apparatus 200b (operation S401), and the optimization processing unit 240b obtains the number of edges e1 in the signal (operation S402). For example, the number of edges in the signal may be detected by using a differentiating circuit.

Then, in the information processing apparatus 100b, the preemphasis amount control unit 140b sets the preemphasis driver 122 to reduce the amount of preemphasis on the high-frequency component by one operation (operation S303). The preemphasis amount control unit 140b then instructs the specific data generating unit 150 to generate data of the specific pattern and to output the data to the transmitting unit 120. This control causes transmission of the signal of the specific pattern with preemphasis on the high-frequency component from the information processing apparatus 100b to the information processing apparatus 200b (operation S304).

The signal of the specific pattern is received by the receiving unit 220 of the information processing apparatus 200b (operation S403). The optimization processing unit 240b obtains the number of edges e2 in the signal (operation S404) and compares the number of edges e1 and the number of edges e2. If the number of edges e2 is not smaller than the number of edges e1 (No in operation S405), the optimization processing unit 240b transmits a response indicating the number of edges e2 to the information processing apparatus 100b via the transmitting unit 230 (operation S406). The optimization processing unit 240b waits for reception of the next signal of the specific pattern.

If number of edges e2 is smaller than the number of edges e1 (Yes in operation S405), the amount of preemphasis on the high-frequency component is optimized. Therefore, the optimization processing unit 240b transmits a response indicating the completion of optimization to the information processing apparatus 100b via the transmitting unit 230 (operation S407) and terminates the processing.

In the information processing apparatus 100b, the preemphasis amount control unit 140b receives the response transmitted from the information processing apparatus 200b via the receiving unit 130 (operation S305). If the response indicates the completion of optimization (Yes in operation S306), the preemphasis amount control unit 140b terminates the processing. Otherwise (No in operation S306), the preemphasis amount control unit 140b returns to operation S303 to perform the control for transmitting the signal with the amount of preemphasis further reduced by one operation.

As described above, in the second embodiment, the number of edges in a signal of a specific pattern transmitted by the transmitting apparatus with a varying amount of preemphasis is detected in the receiving apparatus. The amount of preemphasis on the high-frequency component is adjusted by monitoring for a change in the detected number of edges. Thus, the autonomous cooperation between these apparatuses enables optimization of the amount of preemphasis on the high-frequency component.

In the above-described embodiment, the number of edges in the first received signal is compared with the number of edges in the current received signal. However, the number of edges in the last received signal may be compared with the number of edges in the current received signal.

Alternatively, the receiving apparatus may simply detect the number of edges in the received signal and return the number of edges to the transmitting apparatus. The transmitting apparatus may then compare the returned number of edges with the number of edges supposed to be included in the signal it has transmitted, and determine whether or not the amount of preemphasis on the high-frequency component is optimized.

Third Embodiment

For a third embodiment, description will be given of an example in which the receiving apparatus measures the amplitude of a preemphasized part and an umpreemphasized part of the high-frequency component and optimizes the amount of preemphasis on the high-frequency component based on the measurement result.

Figure 11:
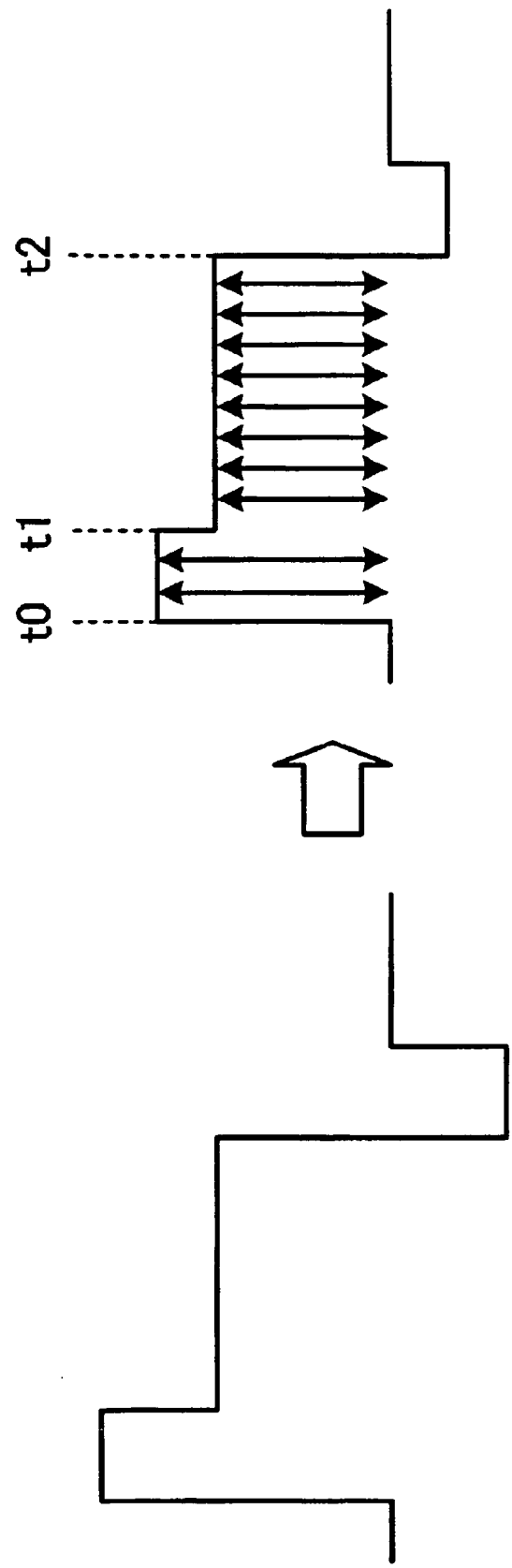
FIG. 11 is a diagram showing exemplary amplitudes of a signal received by the receiver when the signal of a specific pattern is transmitted.

First, the outline of an adjusting method according to this embodiment will be described. In the adjusting method according to this embodiment, as shown in FIG. 11, the transmitting apparatus transmits a signal of a specific pattern with preemphasis on the high-frequency component to the receiving apparatus. The receiving apparatus uses an analog to digital (A/D) converter or the like to sample and measure the amplitude of the received signal at predetermined time intervals.

Here, the signal of the specific pattern transmitted from the transmitting apparatus has a predefined pattern. The receiving apparatus has knowledge of, for example, a time t1 to the completion of reception of the preemphasized part of the high-frequency component and a time t2 to the completion of reception of the entire signal, measured from a time t0 at which the signal is received.

The receiving apparatus matches the sampling result and the known signal pattern information. The receiving apparatus determines the average amplitude of the preemphasized part (the part between t0 and t1 in the example of FIG. 11) and the average amplitude of the unpreemphasized part (the part between t1 and t2 in the example of FIG. 11) of the high-frequency component in the received signal.

The signal of the specific pattern from the transmitting apparatus to the receiving apparatus is transmitted initially with a relatively large amount of preemphasis on the high-frequency component. The transmission is repeated with a gradually reduced amount of preemphasis. Meanwhile, for every received signal of the specific pattern, the receiving apparatus determines the average amplitudes of the preemphasized part and the unpreemphasized part of the high-frequency component and compares the average amplitudes.

Figure 12:
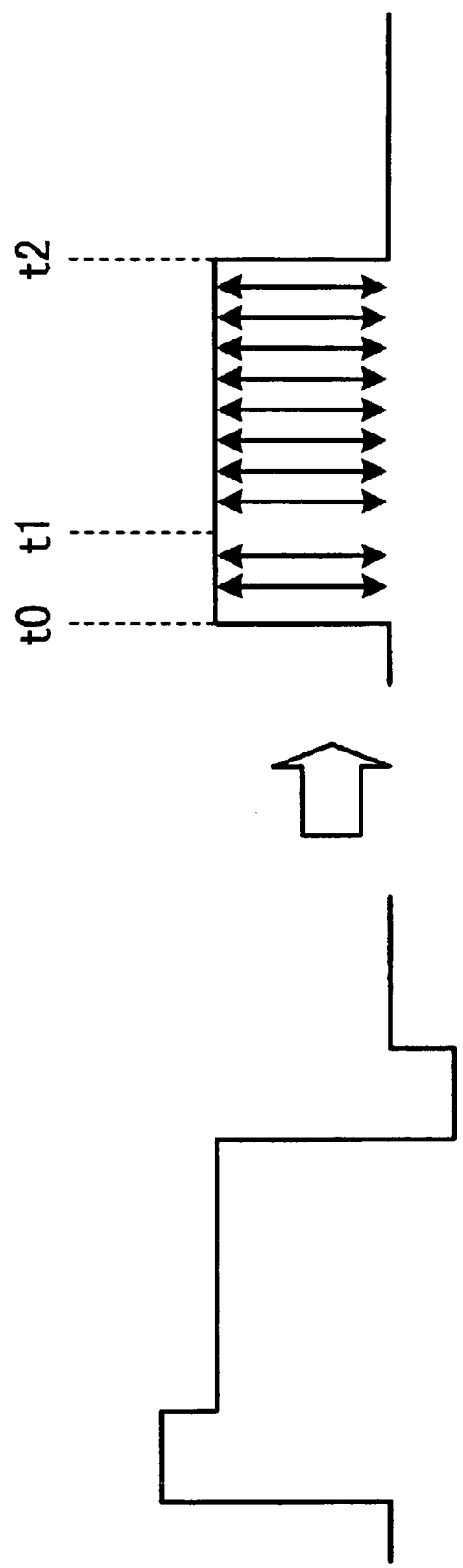
FIG. 12 is a diagram showing exemplary amplitudes of the signal received by the receiver when the amount of preemphasis is optimized.

When the average amplitudes of the preemphasized part and the unpreemphasized part of the high-frequency component in the received signal are equal as in the example of FIG. 12, the receiving apparatus informs the transmitting apparatus that the amount of preemphasis is optimized, and completes the adjusting processing.

In this manner, the adjusting method according to this embodiment samples and measures the amplitude of the received signal at predetermined time intervals to compare the average amplitudes of the preemphasized part and the unpreemphasized part of the high-frequency component. The adjusting method thus automatically optimizes the amount of preemphasis on the high-frequency component. The reason to compare the averages is to reduce the effect of disruption in the signal waveform due to a noise and so on.

Figure 13:
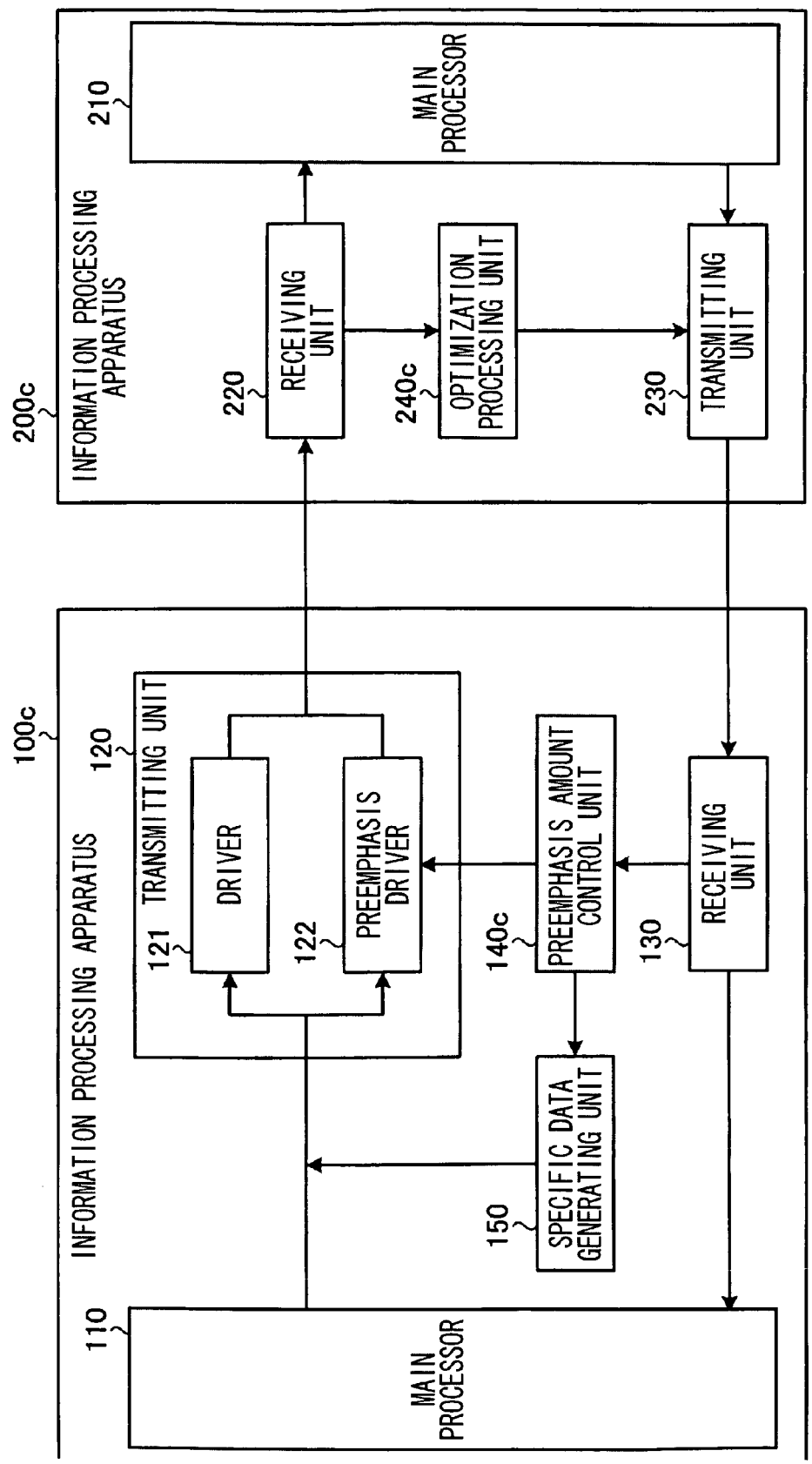
FIG. 13 is a functional block diagram showing the configuration of a transmission system according to a third embodiment.

Now, the configuration of a transmission system that performs the adjusting method according to this embodiment will be described. FIG. 13 is a functional block diagram showing the configuration of the transmission system according to this embodiment. As shown, the transmission system according to this embodiment includes an information processing apparatus 100c and an information processing apparatus 200c connected to each other.

For simplicity, FIG. 13 illustrates only the configuration for optimizing the amount of preemphasis on the high-frequency component of a signal transmitted from the information processing apparatus 100c to the information processing apparatus 200c. As used herein, information processing apparatuses generally mean apparatuses that exchange information with other apparatuses, and include communication apparatuses and so on. The connection between the information processing apparatus 100c and the information processing apparatus 200c may be based on any technique. For example, it may be network-based connection, or connection through a dedicated cable for interconnecting the apparatuses.

As shown, the information processing apparatus 100c has the same configuration as the information processing apparatus 100a shown in FIG. 4 except that the preemphasis amount control unit 140a is replaced with a preemphasis amount control unit 140c. The information processing apparatus 200c has the same configuration as the information processing apparatus 200a shown in FIG. 4 except that the optimization processing unit 240a is replaced with an optimization processing unit 240c.

The preemphasis amount control unit 140c is a control unit that performs control for optimizing the amount of preemphasis on the high-frequency component of the signal to be output from the transmitting unit 120. Specific control of the preemphasis amount control unit 140c will be described in detail in the description of a procedure for the transmission system according to this embodiment.

The optimization processing unit 240c is a processing unit that performs processing for optimizing the amount of preemphasis on the high-frequency component of the signal received by the receiving unit 220. Specific processing of the optimization processing unit 240c will be described in detail in the description of the procedure for the transmission system according to this embodiment.

Figure 14:
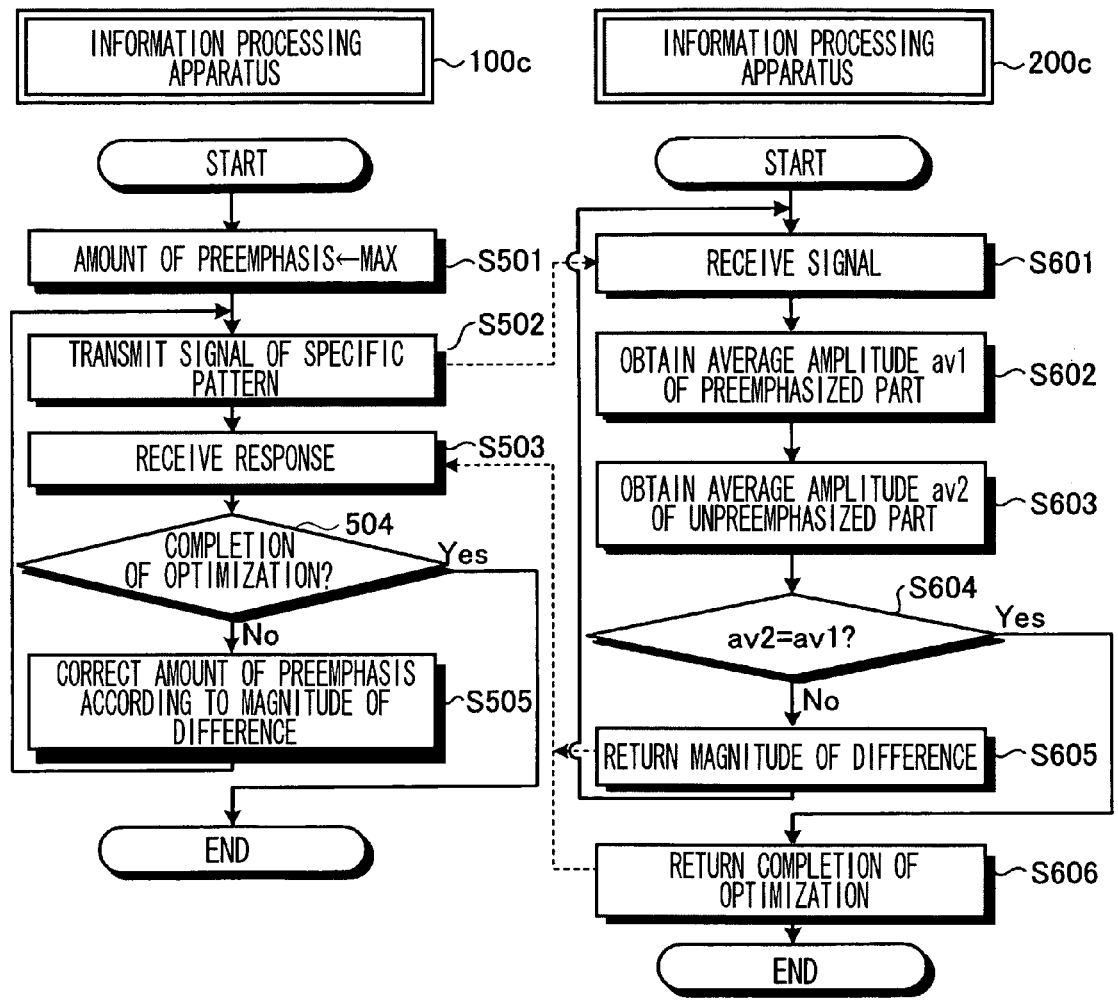
FIG. 14 is a flowchart showing a procedure for the transmission system according to the third embodiment.

Now, the procedure for the transmission system according to this embodiment will be described. FIG. 14 is a flowchart showing the procedure for the transmission system according to this embodiment. FIG. 14 shows the procedure for optimizing the amount of preemphasis on the high-frequency component of the signal transmitted from the information processing apparatus 100c to the information processing apparatus 200c. This procedure is performed before starting transmission of main signals from the information processing apparatus 100c to the information processing apparatus 200c.

To optimize the amount of preemphasis on the high-frequency component, first in the information processing apparatus 100c, the preemphasis amount control unit 140c sets the preemphasis driver 122 to preemphasize the high-frequency component up to a preset maximum value (operation S501). The preemphasis amount control unit 140c then instructs the specific data generating unit 150 to generate data of a specific pattern and to output the data to the transmitting unit 120. This control causes transmission of a signal of the specific pattern with preemphasis on the high-frequency component from the information processing apparatus 100c to the information processing apparatus 200c (operation S502).

The signal of the specific pattern is received by the receiving unit 220 of the information processing apparatus 200c (operation S601). The optimization processing unit 240c obtains the average amplitude av1 of the preemphasized part of the signal (operation S602) and obtains the average amplitude av2 of the unpreemphasized part of the signal (operation S603).

The optimization processing unit 240c compares the average av1 and the average av2. If the average av1 is not equal to the average av2 (No in operation S604), the optimization processing unit 240c transmits a response indicating the magnitude of the difference between the average av1 and the average av2 to the information processing apparatus 100c via the transmitting unit 230 (operation S605). The optimization processing unit 240c waits for reception of the next signal of the specific pattern.

If the average av1 is equal to the average av2 (Yes in operation S604), the amount of preemphasis on the high-frequency component is optimized. Therefore, the optimization processing unit 240c transmits a response indicating the completion of optimization to the information processing apparatus 100c via the transmitting unit 230 (operation S606) and terminates the processing.

In the information processing apparatus 100c, the preemphasis amount control unit 140c receives the response transmitted from the information processing apparatus 200c via the receiving unit 130 (operation S503). If the response indicates the completion of optimization (Yes in operation S504), the preemphasis amount control unit 140c terminates the processing.

If the response indicates the amount of the difference between the average amplitudes (No in operation S504), the preemphasis amount control unit 140c determines a corrected amount of preemphasis on the high-frequency component according to the magnitude of the difference and corrects the setting of the preemphasis driver 122 (operation S505). The preemphasis amount control unit 140c returns to operation S502 to perform the control for transmitting the signal of the specific pattern to the information processing apparatus 200c.

As described above, in the third embodiment, the amplitude of a signal of a specific pattern transmitted by the transmitting apparatus with a varying amount of preemphasis is measured in the receiving apparatus at predetermined intervals. The amount of preemphasis on the high-frequency component is adjusted by monitoring the difference between the average amplitude of the preemphasized part and the average amplitude of the unpreemphasized part. Thus, the autonomous cooperation between these apparatuses enables optimization of the amount of preemphasis on the high-frequency component.

Fourth Embodiment

For a fourth embodiment, description will be given of an example in which the receiving apparatus measures the times during which waveforms of a received signal fall within predetermined ranges and optimizes the amount of preemphasis on the high-frequency component based on the measurement result.

Figure 15:
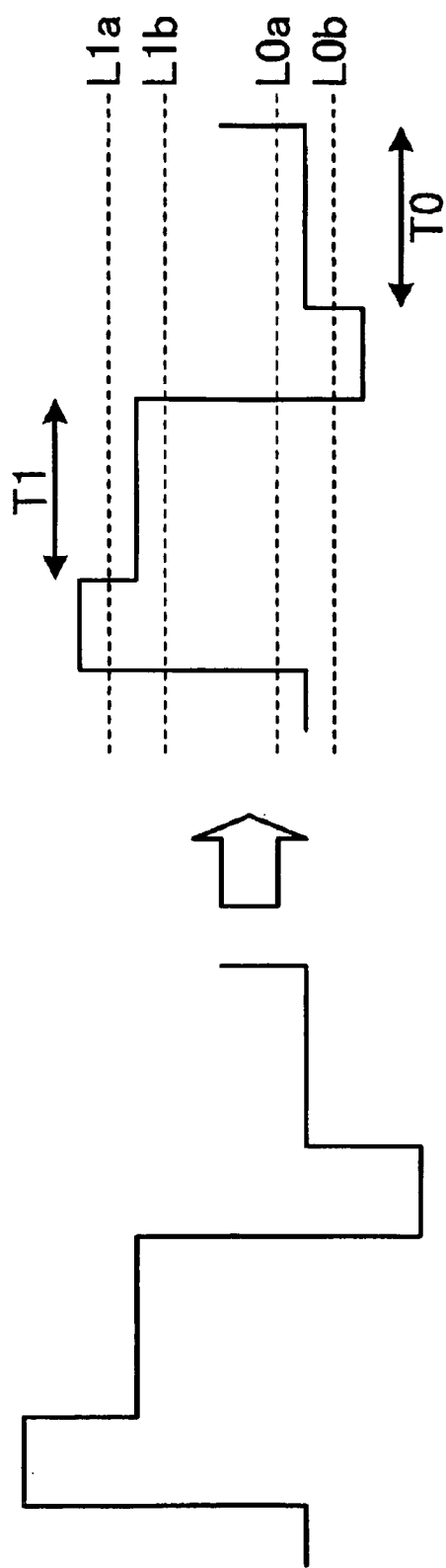
FIG. 15 is a diagram showing exemplary times during which waveforms fall within predetermined ranges in the receiver when a signal of a specific pattern is transmitted.

First, the outline of an adjusting method according to this embodiment will be described. In the adjusting method according to this embodiment, as shown in FIG. 15, the transmitting apparatus transmits a signal of a specific pattern with preemphasis on the high-frequency component to the receiving apparatus. The receiving apparatus measures the times during which the waveforms of the received signal fall within the predetermined ranges.

Specifically, two thresholds L0a and L0b are provided above and below an unpreemphasized part of the high-frequency component on the Low side. A time T0 is measured during which a waveform corresponding to the logical value 0 falls within the range between these thresholds. Further, two thresholds L1a and L1b are provided above and below an unpreemphasized part of the high-frequency component on the High side. A time T1 is measured during which a waveform corresponding to the logical value 1 falls within the range between these thresholds.

The values of these thresholds may be determined based on, for example, the result of measuring the amplitude of a low-frequency signal transmitted in advance from the transmitting apparatus to the receiving apparatus. The width between the thresholds L0a and L0b and the width between the thresholds L1a and L1b may be set appropriately depending on the required adjustment accuracy and so on.

The signal of the specific pattern from the transmitting apparatus to the receiving apparatus is transmitted initially with a relatively large amount of preemphasis on the high-frequency component. The transmission is repeated with a gradually reduced amount of preemphasis. Meanwhile, for every received signal, the receiving apparatus measures the time T0 during which the signal waveform falls within the range between the thresholds L0a and L0b, and the time T1 during which the signal waveform falls within the range between the thresholds L1a and L1b.

When the receiving apparatus recognizes that the measured times are longer than predetermined times, the receiving apparatus informs the transmitting apparatus that the amount of preemphasis is optimized, and completes the adjusting processing. Here, the predetermined times are times measured when the signal is received for the first time, or times preset for each transmitted signal of the specific pattern.

Initially, the times measured in the receiving apparatus are the times during which the unpreemphasized parts of the high-frequency component are being received. Then, the amount of preemphasis on the high-frequency component is reduced until optimized, at which point the waveforms for the preemphasized parts have the same height as the waveforms for the unpreemphasized parts as shown in FIG. 16. Therefore, the measured times include the times during which the preemphasized parts are being received.

In this manner, the adjusting method according to this embodiment utilizes the fact that the times during which the waveforms of the signal received by the receiving apparatus fall within predetermined ranges change upon optimization of the amount of preemphasis on the high-frequency component. The adjusting method thus automatically optimizes the amount of preemphasis on the high-frequency component.

Figure 17:
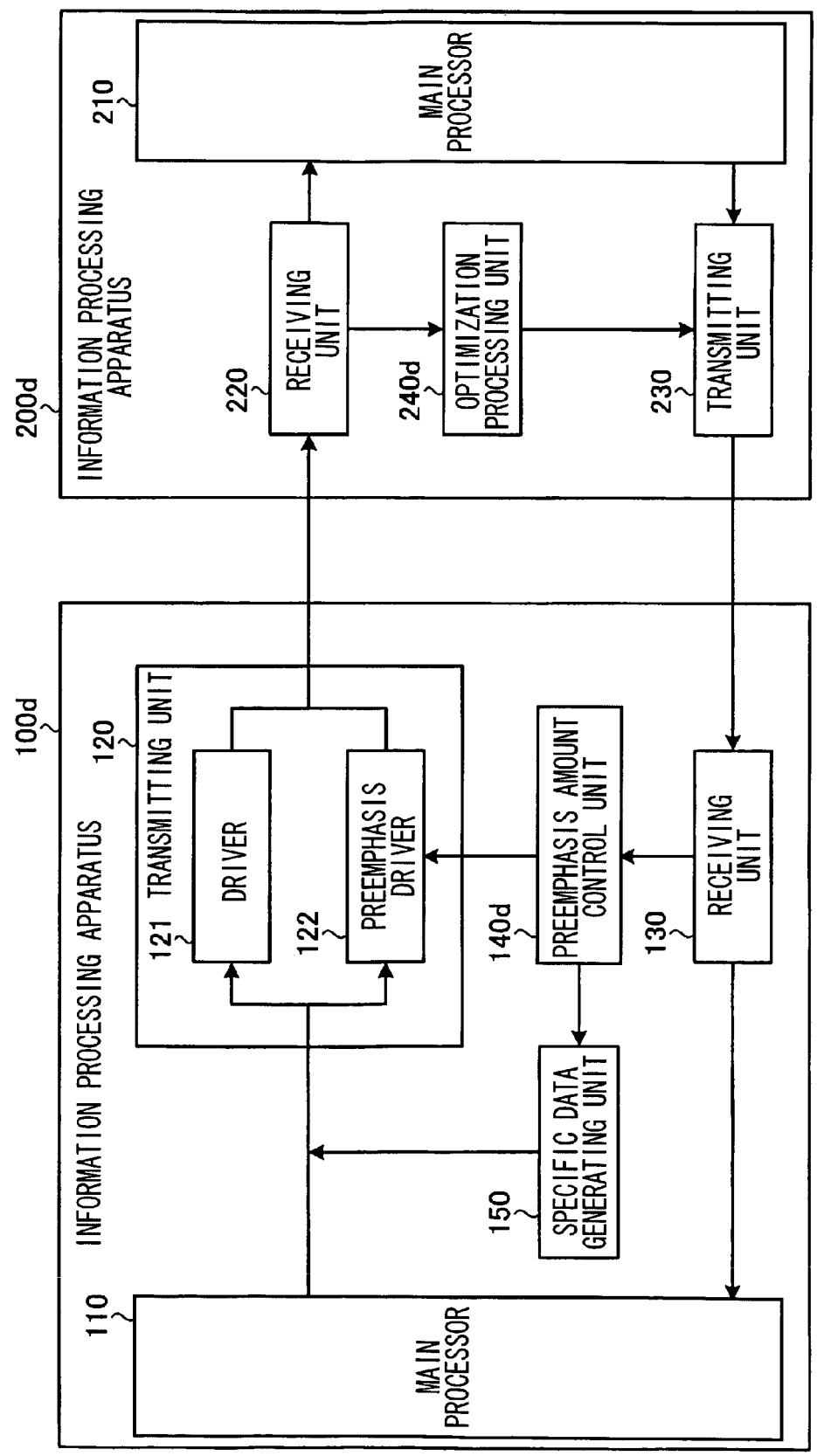
FIG. 17 is a functional block diagram showing the configuration of a transmission system according to a fourth embodiment.

Now, the configuration of a transmission system that performs the adjusting method according to this embodiment will be described. FIG. 17 is a functional block diagram showing the configuration of the transmission system according to this embodiment. As shown, the transmission system according to this embodiment includes an information processing apparatus 100d and an information processing apparatus 200d connected to each other.

For simplicity, FIG. 17 illustrates only the configuration for optimizing the amount of preemphasis on the high-frequency component of a signal transmitted from the information processing apparatus 100d to the information processing apparatus 200d. As used herein, information processing apparatuses generally mean apparatuses that exchange information with other apparatuses, and include communication apparatuses and so on. The connection between the information processing apparatus 100d and the information processing apparatus 200d may be based on any technique. For example, it may be network-based connection, or connection via a dedicated cable for interconnecting the apparatuses.

As shown, the information processing apparatus 100d has the same configuration as the information processing apparatus 100a shown in FIG. 4 except that the preemphasis amount control unit 140a is replaced with a preemphasis amount control unit 140d. The information processing apparatus 200d has the same configuration as the information processing apparatus 200a shown in FIG. 4 except that the optimization processing unit 240a is replaced with an optimization processing unit 240d.

The preemphasis amount control unit 140d is a control unit that performs control for optimizing the amount of preemphasis on the high-frequency component of the signal to be output from the transmitting unit 120. Specific control of the preemphasis amount control unit 140d will be described in detail in the description of a procedure for the transmission system according to this embodiment.

The optimization processing unit 240d is a processing unit that performs processing for optimizing the amount of preemphasis on the high-frequency component of the signal received by the receiving unit 220. Specific processing of the optimization processing unit 240d will be described in detail in the description of the procedure for the transmission system according to this embodiment.

Figure 18:
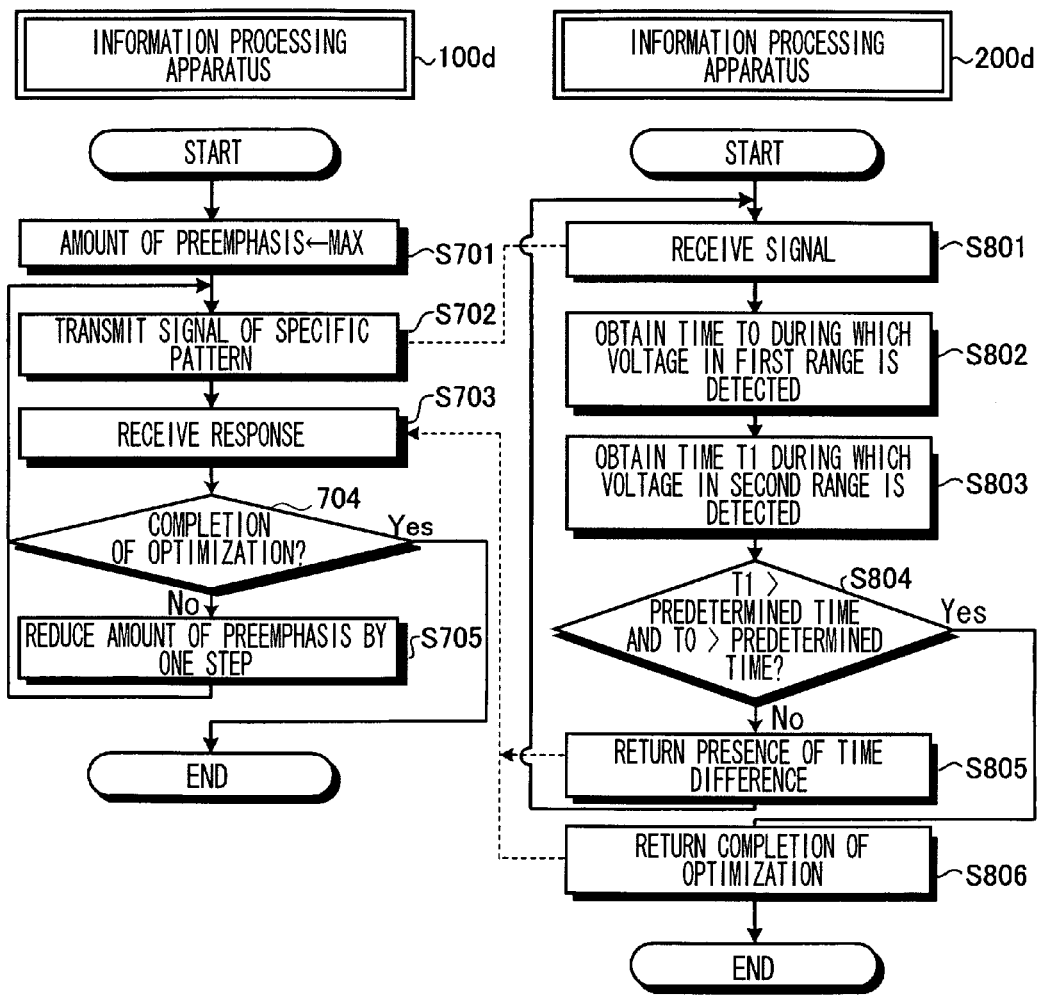
FIG. 18 is a flowchart showing a procedure for the transmission system according to the fourth embodiment.

Now, the procedure for the transmission system according to this embodiment will be described. FIG. 18 is a flowchart showing the procedure for the transmission system according to this embodiment. FIG. 18 shows the procedure for optimizing the amount of preemphasis on the high-frequency component of the signal transmitted from the information processing apparatus 100d to the information processing apparatus 200d. This procedure is performed before starting transmission of main signals from the information processing apparatus 100d to the information processing apparatus 200d.

To optimize the amount of preemphasis on the high-frequency component, first in the information processing apparatus 100d, the preemphasis amount control unit 140d sets the preemphasis driver 122 to preemphasize the high-frequency component up to a preset maximum value (operation S701). The preemphasis amount control unit 140d then instructs the specific data generating unit 150 to generate data of a specific pattern and to output the data to the transmitting unit 120. This control causes transmission of a signal of the specific pattern with preemphasis on the high-frequency component from the information processing apparatus 100d to the information processing apparatus 200d (operation S702).

The signal of the specific pattern is received by the receiving unit 220 of the information processing apparatus 200d (operation S801). The optimization processing unit 240d measures the time T0 during which the waveform corresponding to the logical value 0 falls within the range between the thresholds L0a and L0b (operation S802). The optimization processing unit 240d further measures the time T1 during which the waveform corresponding to the logical value 1 falls within the range between the thresholds L1a and L1b (operation S803).

If the time T0 is not longer than a predetermined time or if the time T1 is not longer than a predetermined time (No in operation S804), the optimization processing unit 240d transmits a response indicating the presence of a time difference from the predetermined time to the information processing apparatus 100d via the transmitting unit 230 (operation S805). The optimization processing unit 240d waits for reception of the next signal of the specific pattern.

If the time T0 is longer than the predetermined time and the time T1 is longer than the predetermined time (Yes in operation S804), the amount of preemphasis on the high-frequency component is optimized. Therefore, the optimization processing unit 240d transmits a response indicating the completion of optimization to the information processing apparatus 100d via the transmitting unit 230 (operation S806) and terminates the processing.

In the information processing apparatus 10d, the preemphasis amount control unit 140d receives the response transmitted from the information processing apparatus 200d via the receiving unit 130 (operation S703). If the response indicates the completion of optimization (Yes in operation S704), the preemphasis amount control unit 140d terminates the processing.

If the response indicates the presence of a time difference from the predetermined time (No in operation S704), the preemphasis amount control unit 140d sets the preemphasis driver 122 to reduce the amount of preemphasis on the high-frequency component by one operation (operation S705). The preemphasis amount control unit 140d returns to operation S702 to perform the control for transmitting the signal of the specific pattern to the information processing apparatus 200d.

As described above, in the fourth embodiment, the times during which a signal of a specific pattern transmitted by the transmitting apparatus with a varying amount of preemphasis fall within predetermined ranges are measured. The amount of preemphasis on the high-frequency component is adjusted by monitoring for a change in the measurement result. Thus, the autonomous cooperation between these apparatuses enables optimization of the amount of preemphasis on the high-frequency component.

In the above-described embodiment, the measured times are compared with the predetermined times. However, it is also possible to compare the times measured in the last signal reception with the currently measured times and, if the currently measured times are longer, determine that the amount of preemphasis on the high-frequency component is optimized. Also in the above-described embodiment, the thresholds are provided on both the High side and the Low side. However, it is also possible to provide the thresholds only on one side and measure the time only on that side.

Fifth Embodiment

The information processing apparatuses 100a to 100d and the information processing apparatuses 200a to 200d described in the above embodiments may use a program to realize the functions for optimizing the amount of preemphasis on the high-frequency component, i.e., the functions of the preemphasis amount control units 140a to 140d, the specific data generating unit 150, and the optimization processing units 240a to 240d.

For this embodiment, description will be given of a preemphasis amount adjusting program 1071 that implements the functions of the preemphasis amount control units 140a to 140d, the specific data generating unit 150, and the optimization processing units 240a to 240d as software and optimizes the amount of preemphasis on the high-frequency component of signals transmitted over a network.

The preemphasis amount adjusting program 1071 does not need to have all the functions of the preemphasis amount control units 140a to 140d but only needs to have any one of them. Also, the preemphasis amount adjusting program 1071 does not need to have all the functions of the optimization processing units 240a to 240d but only needs to have any one of them.

Figure 19:
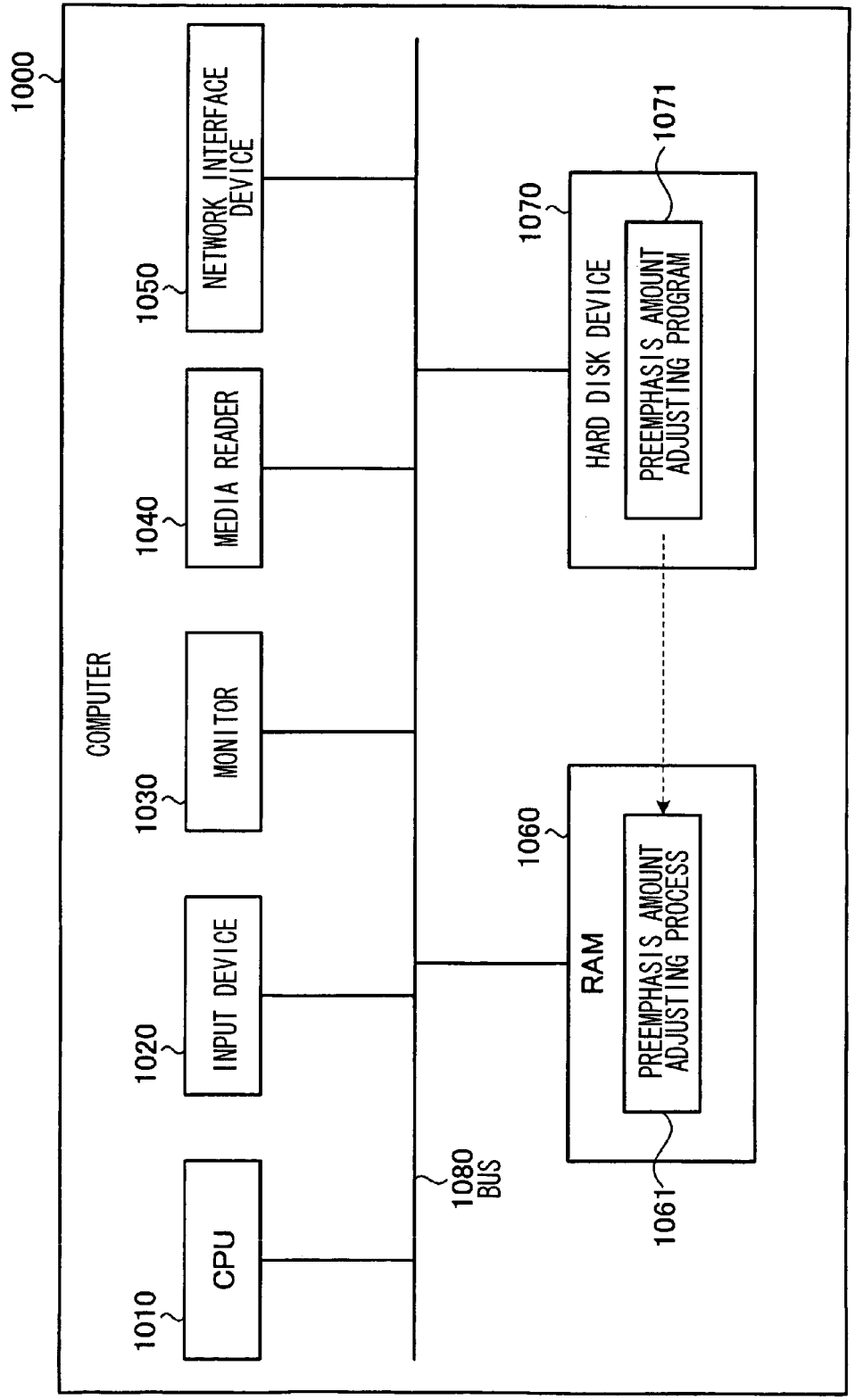
FIG. 19 is a functional block diagram showing a computer that executes a preemphasis amount adjusting program.

FIG. 19 is a functional block diagram showing a computer 1000 that executes the preemphasis amount adjusting program 1071. The computer 1000 is configured with a CPU (Central Processing Unit) 1010 that performs various operation processing, an input device 1020 that receives data input from a user, a monitor 1030 that displays various kinds of information, a media reader 1040 that reads programs and so on from a recording medium, a network interface device 1050 that transmits and receives data to and from other computers over the network, a RAM (Random Access Memory) 1060 that temporarily stores various kinds of information, and a hard disk device 1070, all of which are interconnected via a bus 1080.

The preemphasis amount adjusting program 1071 is stored in the hard disk device 1070. The CPU 1010 reads out the preemphasis amount adjusting program 1071 from the hard disk device 1070 and loads it into the RAM 1060, thereby allowing the preemphasis amount adjusting program 1071 to function as a preemphasis amount adjusting process 1061.

The preemphasis amount adjusting process 1061 performs various kinds of data processing by using an area in the RAM 1060 allocated for itself. The preemphasis amount adjusting process 1061 also performs processing for optimizing the amount of preemphasis on the high-frequency component of signals exchanged via the network interface device 1050.

The preemphasis amount adjusting program 1071 does not necessarily have to be stored in the hard disk device 1070. The computer 1000 may read out the program stored in a recording medium such as a CD-ROM and execute the program. Alternatively, the program may be stored in another computer (or server) connected to the computer 1000 over a public line, the Internet, a LAN (Local Area Network), a WAN (Wide Area Network), or the like, so that the computer 1000 may read out the program from the other computer and execute the program.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus with communication capability connected to another apparatus through a communication path to communicate with the other apparatus, comprising:
   a receiving unit that receives specific data from the other apparatus;
   an optimization processing unit that determines optimal setting information about a preemphasized component of the specific data; and
   a transmitting unit that transmits the optimal setting information to the other apparatus,
   wherein for a first specific data item in the specific data transmitted in such a manner that one bit of the logical value 1 and one bit of the logical value 0 are alternately transmitted with the preemphasized component and a second specific data item in the specific data transmitted in such a manner that a plurality of bits of the logical value 1 and a plurality of bits of the logical value 0 are alternately transmitted, the optimization processing unit compares the amplitude of the first specific data item with the amplitude of the second specific data item to determine the optimal setting information about the preemphasized component such that the amplitude of the first specific data item equals the amplitude of the second specific data item.

2. The apparatus with communication capability according to claim 1, wherein
   the optimization processing unit determines the optimal setting information about the preemphasized component by determining edges from a waveform of the specific data and detecting a change in the number of edges in one cycle of the specific data to a predetermined number.

3. The apparatus with communication capability according to claim 1, wherein
   the optimization processing unit determines the optimal setting information about the preemphasized component by detecting that a waveform corresponding to the logical value 1 of the specific data falls within a range between two thresholds for a predetermined time period and that a waveform corresponding to the logical value 0 of the specific data falls within a range between two thresholds for a predetermined time period.

4. An adjusting method for an apparatus with communication capability connected to another apparatus through a communication path to communicate with the other apparatus, comprising:
   a transmission processing operation of transmitting specific data with a preemphasized component to the other apparatus, the preemphasized component being varied within a predetermined range by changing a setting of a preemphasis driver; and
   a characteristic setting operation of setting, for the preemphasis driver, optimal setting information about the preemphasized component of the specific data received from the other apparatus in response to the transmission of the specific data in the transmission processing operation,
   wherein a first specific data in the transmitting specific data is transmitted in such a manner that a plurality of bits of the logical value 1 and a plurality of bits of the logical value 0 are alternately transmitted and then one bit of the logical value 1 and one bit of the logical value 0 are alternately transmitted with the preemphasized component,
   a second specific data item in the transmitting specific data is transmitted in such a manner that a plurality of bits of the logical value 1 and a plurality of bits of the logical value 0 are alternately transmitted with the preemphasized component,
   the optimal setting information is determined by a condition that the amplitude of the first specific data item equals the amplitude of the second specific data item.

5. A non-transitory computer-readable storage medium having stored therein a program for adjusting communication performed by an apparatus with communication capability, the apparatus being connected to another apparatus through a communication path to communicate with the other apparatus, the program comprising:
   a transmission processing operation of transmitting specific data with a preemphasized component to the other apparatus, the preemphasized component being varied within a predetermined range by changing a setting of a preemphasis driver; and
   a characteristic setting operation of setting, for the preemphasis driver, optimal setting information about the preemphasized component of the specific data received from the other apparatus in response to the transmission of the specific data in the transmission processing operation,
   wherein a first specific data in the transmitting specific data is transmitted in such a manner that a plurality of bits of the logical value 1 and a plurality of bits of the logical value 0 are alternately transmitted and then one bit of the logical value 1 and one bit of the logical value 0 are alternately transmitted with the preemphasized component,
   a second specific data item in the transmitting specific data is transmitted in such a manner that a plurality of bits of the logical value 1 and a plurality of bits of the logical value 0 are alternately transmitted with the preemphasized component,
   the optimal setting information is determined by a condition that the amplitude of the first specific data item equals the amplitude of the second specific data item.

6. A system comprising a transmitter and a receiver connected to each other through a transmission path, wherein
   the transmitter comprises:
   a transmitting unit that transmits specific data with a preemphasized component to the receiver, the preemphasized component being varied within a predetermined range by changing a setting of a preemphasis driver; and
   a preemphasis amount control unit that sets, for the preemphasis driver, optimal setting information about the preemphasized component of the specific data received from the receiver in response to the transmission of the specific data from the transmitting unit, and
   the receiver comprises:
   a receiving unit that receives specific data from the transmitter;
   an optimization processing unit that determines optimal setting information about the preemphasized component of the specific data; and
   a transmitting unit that transmits the optimal setting information to the transmitter,
   wherein for a first specific data item in the specific data transmitted in such a manner that one bit of the logical value 1 and one bit of the logical value 0 are alternately transmitted with the preemphasized component and a second specific data item in the specific data transmitted in such a manner that a plurality of bits of the logical value 1 and a plurality of bits of the logical value 0 are alternately transmitted, the optimization processing unit compares the amplitude of the first specific data item with the amplitude of the second specific data item to determine the optimal setting information about the preemphasized component such that the amplitude of the first specific data item equals the amplitude of the second specific data item.

7. The system according to claim 6, wherein
the specific data transmitted from the transmitter is transmitted in such a manner that a plurality of bits of the logical value 1 and a plurality of bits of the logical value 0 are alternately transmitted and then one bit of the logical value 1 and one bit of the logical value 0 are alternately transmitted with the preemphasized component.

8. The system according to claim 6, wherein
the specific data transmitted from the transmitter is transmitted in such a manner that a plurality of bits of the logical value 1 and a plurality of bits of the logical value 0 are alternately transmitted with the preemphasized component.

9. The system according to claim 6, wherein
the optimization processing unit determines the optimal setting information about the preemphasized component by determining edges from a waveform of the specific data and detecting a change in the number of edges in one cycle of the specific data to a predetermined number.

10. The system according to claim 6, wherein
the optimization processing unit determines the optimal setting information about the preemphasized component by detecting that a waveform corresponding to the logical value 1 of the specific data falls within a range between two thresholds for a predetermined time period and that a waveform corresponding to the logical value 0 of the specific data falls within a range between two thresholds for a predetermined time period.

* * * * *